United States Patent
Veige et al.

(10) Patent No.: US 9,206,266 B2
(45) Date of Patent: Dec. 8, 2015

(54) TRIDENTATE PINCER LIGAND SUPPORTED METAL-ALKYLIDYNE AND METALLACYCLOALKYLENE COMPLEXES FOR ALKYNE POLYMERIZATION

(71) Applicant: UNIVERSITY OF FLORIDA RESEARCH FOUNDATION, INC., Gainesville, FL (US)

(72) Inventors: Adam Steven Veige, Gainsville, FL (US); Soumya Sarkar, Ithaca, NY (US); Kevin Patrick McGowan, Durham, NC (US); Subramaniam Kuppuswamy, Waltham, MA (US); Christopher D. Roland, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

(21) Appl. No.: 14/299,449

(22) Filed: Jun. 9, 2014

(65) Prior Publication Data
US 2014/0309389 A1  Oct. 16, 2014

Related U.S. Application Data

(63) Continuation-in-part of application No. PCT/US2012/065841, filed on Nov. 19, 2012.

(60) Provisional application No. 61/567,909, filed on Dec. 7, 2011, provisional application No. 61/845,764, filed on Jul. 12, 2013.

(51) Int. Cl.
C08F 4/78    (2006.01)
C08F 38/00   (2006.01)
C08F 4/62    (2006.01)

(52) U.S. Cl.
CPC .............. *C08F 4/78* (2013.01); *C08F 4/62082* (2013.01); *C08F 4/62141* (2013.01); *C08F 38/00* (2013.01)

(58) Field of Classification Search
CPC ......... C08F 4/62141; C08F 4/78; C08F 38/00
See application file for complete search history.

(56) References Cited

U.S. PATENT DOCUMENTS

2009/0281343 A1* 11/2009 Veige et al. ............. 556/58
2011/0313174 A1* 12/2011 Veige et al. ............. 548/402

FOREIGN PATENT DOCUMENTS

WO    WO 2004-013198    2/2004

OTHER PUBLICATIONS

Bailey, B.C. et al., "Snapshots of an Alkylidyne for Nitride Triple-Bond Metathesis," *J. Am. Chem. Soc.*, 2007, pp. 2234-2235, vol. 129.
Geyer, A.M. et al., "Catalytic Nitrile-Alkyne Cross-Metathesis," *J. Am. Chem. Soc.*, 2007, pp. 3800-3801, vol. 129.
Katz, T.J. et al., "Polymerization of Acetylenes and Cyclic Olefins Induced by Metal Carbynes," *J. Am. Chem. Soc.*, 1984, pp. 2659-2668, vol. 106.
Kuppuswamy, S. et al., "Synthesis and Characterization of Tungsten(VI) Alkylidene Complexes Supported by an $[OCO]^{3-}$ Trianionic Pincer Ligand: Progress towards the $[^tBuOCO]W\equiv CC(CH_3)_3$ Fragment," *Organometallics*, 2010, pp. 4227-4233, vol. 29.
Mortreaux, A. et al., "Reactions of $W(CCMe_3)(OCMe_3)_3$ with terminal alkynes: metathesis and polymerization," *Journal of Molecular Catalysis A: Chemical*, 1995, pp. 95-105, vol. 96.
Sarkar, S. et al., "Addition of Mild Electrophiles to a $Mo\equiv N$ Triple Bond and Nitrile Synthesis via Metal-Mediated N-Atom Transfer to Acid Chlorides," *J. Am. Chem. Soc.*, 2008, pp. 16128-16129, vol. 130.
Sarkar, S. et al., "Synthesis, Characterization, and Reactivity of a $d^2$, Mo(IV) Complex Supported by a New OCO-Trianionic Pincer Ligand," *J. Am. Chem. Soc.*, 2008, pp. 1116-1117, vol. 130.

* cited by examiner

*Primary Examiner* — Caixia Lu
(74) *Attorney, Agent, or Firm* — Saliwanchik, Lloyd & Eisenschenk

(57) ABSTRACT

Tridentate pincer ligand supported metal complexes are formed where the complex is a trianionic pincer ligand supported metal-alkylidyne complex or a tetra-anionic pincer-ligand supported metallacycloalkylene complex formed by addition of an alkyne to the trianionic pincer ligand supported metal-alkylidyne complex. The tridentate pincer ligand supported metal complex that includes a group 5-7 transition metal and an OCO trianionic pincer ligand or an alkyne adduct thereof and methods of preparing the complexes are disclosed. The use of the tridentate pincer ligand supported metal complex for the polymerization of alkynes is disclosed, where high molecular weight poly(alkyne)s can be formed in high yield. The poly(alkyne) can be a macrocyclic polymer.

23 Claims, 14 Drawing Sheets

Selected bond lengths (Å): W1−C33 = 1.905(3), W1−C27 = 2.044(3), W1−C32 = 2.009(3), W1−O1 = 1.972(2), W1−O2 = 1.976(2), W1−O3 = 2.323(2), C32−C33 = 1.312(4);
Selected angles (deg): O1−W1−O2 = 150.25(9), C33−W1−C32 = 86.60(12), C32−W1−C27 = 37.76(12), C32−C27−C28 = 138.4(3), C33−W1−O3 = 137.67(10).

Selected bond lengths (Å): W1–C33 = 1.910(4), W1–C27 = 2.026(4), W1–C32 = 2.030(4), W1–O1 = 1.967(3), W1–O2 = 1.984(3), W1–O3 = 2.288(3), C32–C27 = 1.321(6)
Selected bond angles (°); O1–W1–O2 = 151.66(11), C33–W1–C32 = 89.64(17), C32–W1–C27 = 38.01(16), C32–C27–C28 = 139.0(4), C40–C32–C27 = 138.2(4), C33–W1–O3 = 133.51(14)

Selected bond lengths (Å): W1–C44 = 1.884(4), W1–C27 = 2.062(4), W1–C42 = 2.070(4), C27–C34 = 1.354(6), C42–C35 = 1.342(5), C34–C35 = 1.495(5), W1–O1 = 1.972(2), W1–O2 = 1.976(2)
Selected bond angles (deg): O1–W1–O2 = 166.74(11), C44–W1–C27 = 133.91(17), C44–W1–C42 = 131.03(16), C27–W1–C42 = 95.06(16)

a)

b)

TRIDENTATE PINCER LIGAND SUPPORTED METAL-ALKYLIDYNE AND METALLACYCLOALKYLENE COMPLEXES FOR ALKYNE POLYMERIZATION

CROSS-REFERENCE TO RELATED APPLICATIONS

This application is a continuation-in-part of International Patent Application No. PCT/US2012065841, filed Nov. 19, 2012, which claims the benefit of U.S. Provisional Patent Application Ser. No. 61/567,909, filed Dec. 7, 2011, and also claims the benefit of U.S. Provisional Patent Application Ser. No. 61/845,764, filed Jul. 12, 2013, the disclosures of which are hereby incorporated by reference in their entirety.

This invention was made with government support under CHE-0748408 awarded by the National Science Foundation. The government has certain rights in the invention.

BACKGROUND OF INVENTION

High oxidation state alkylidene and alkylidyne metal complexes have been known for about 40 years. Alkene and alkyne metathesis via these metal complexes has been studied extensively. Alkylidyne metal complexes have been studied to a lesser extent than their alkylidene analogues, but they are of particular interest for their potential to promote nitrile-alkyne cross metathesis (NACM), which constitutes a potentially valuable tool to prepare novel alkynes from readily accessible nitriles.

Metal-alkylidynes contain a metal-carbon triple bond. Metal-alkylidynes, having a metal in its highest oxidation state, are known as Schrock-type metal-alkylidynes, and have been widely investigated. In high-oxidation state metal-alkylidynes, the alkylidyne carbon is a 6-electron donor that provides $\pi$-donation to the metal center. In spite of extensive $\pi$-donation, most high-oxidation state metal-alkylidynes are electron deficient and must be stabilized by additional ligands.

Schrock-type metal-alkylidynes are generally formed by the deprotonation of an $\alpha$-CH, where a base deprotonates the $\alpha$-carbon to form an alkylidyne from the alkylidene, or by an $\alpha$-elimination reaction, in which bulky alkyl groups promote deprotonation of the $\alpha$-CH to release steric crowding during formation of metal-alkylidynes. In rare cases, these complexes have been formed by a metathesis reaction between an alkyne and a metal-metal triple bond, or by a reductive recycle series of reactions, where a gem-dichloride reacts with a metal complex, to form a mixture of a metal chloride complex and a metal alkylidene, followed by reduction of the metal chloride complex back to the original metal complex.

A catalytic NACM was reported by Geyer et al., *J. Am. Chem. Soc.* 2007, 129, 3800-1, where a tungsten-nitride of the form $(RO)_3W\equiv N$ was found to reversibly convert to the corresponding metal-alkylidyne upon treatment with an alkyne. Unfortunately, rates of reaction were very slow and a very limited substrate scope was observed. Using a novel titanium alkylidene-alkyl complex $(PNP)Ti\equiv CH^tBu(CH_2{}^tBu)$, where PNP is a phosphorous-nitrogen-phosphorous tridentate pincer-type ligand, and bulky nitriles, NACM was achieved. However, the catalyst required an external electrophile to liberate the alkyne, as reported by Bailey et al., *J. Am. Chem. Soc.* 2007, 129, 2234-5.

Polyacetylenes are organic polymers that can display electrical conductivity, paramagnetic susceptibility, optical non-linearity, photoconductivity, gas permeability, liquid-crystallinity, and chain-helicity. Polymerization of acetylenes employs a transition metal catalyst, generally with a cocatalyst. High molecular weight polyacetylenes ($>10^6$ g/mol) have been produced from catalysts, such as $M(CO)_6-CCl_4-h\nu$ (M=Mo, W), where the active species has been determined to be a metal-alkylidene, with polymerization involving a metathesis pathway. The metal-alkylidyne, $(R_3CO)_3W\equiv CC(CH_3)_3$, has been shown to promote alkyne metathesis and alkyne polymerization, as reported by Mortreux et al., *J. Mol. Catal. A: Chem.* 1995, 96, 95-105, where the product composition varied with the substitution. Polymerization was shown to be the exclusive path only with phenyl or trimethylsilyl monosubstituted acetylenes. The metal-alkylidyne, $H_5C_6C\equiv W(CO)_4Br$, promotes a slow alkyne polymerization without alkyne metathesis as reported by Katz et al., *J. Am. Chem. Soc.* 1984, 106, 2659-68, but only low monomer conversion is observed after periods of days.

One might expect that OCO pincer ligand supported metal-alkylidynes should be well suited as metathesis or polymerization catalysts for alkynes, as: the trianionic nature of the OCO pincer ligand allows access to a +6 oxidation state required for a metal-alkylidyne; the rigid planarity of the OCO pincer ligand imposes geometric restraints around the metal center, which might permit an increase in reactivity; and the strong M—C bond should distort the metal-alkylidyne out of the plane of the ligand, which might further increase the reactivity of the resulting complex.

BRIEF SUMMARY

An embodiment of the invention is directed to a tridentate pincer ligand supported metal complex of a group 5-7 transition metal such as W. The pincer ligand is a trianionic OCO pincer ligand which can be independently substituted at any carbon not bonded to the O's of the OCO coordination sites with H, methyl, ethyl, n-propyl, i-propyl, n-butyl, i-butyl, t-butyl, or $C_5$-$C_{20}$ alkyl, such that near planarity of the trianionic pincer ligand can be achieved in the complex. The alkylidyne can be substituted with methyl, ethyl, n-propyl, i-propyl, n-butyl, i-butyl t-butyl, $C_5$ to $C_{20}$ alkyl, phenyl, naphthyl, $C_{13}$ to $C_{22}$ aryl. One or two other ligands, either neutral molecules or anions, can be attached to the metal. The trianionic pincer ligand supported metal-alkylidyne complex can be a salt where the complex is anionic and has a cationic counter ion.

Another embodiment of the invention is directed to a method for preparation of the trianionic pincer ligand supported metal-alkylidyne complex, where a trialkoxy metal-alkylidyne of a group 5-7 is combined with an OCO pincer ligand, having a 1,1':3',1''-terphenyl-2,2''-diol structure, and deprotonating the 2'-H of the OCO pincer ligand precursor by addition of a base to form the trianionic pincer ligand supported metal-alkylidyne complex in the form of a salt. The salt can be combined with an electrophile to convert the salt into a neutral trianionic pincer ligand supported metal-alkylidyne complex. As desired, the neutral trianionic pincer ligand supported metal-alkylidyne complex can undergo ligand exchange to form a second neutral trianionic pincer ligand supported metal-alkylidyne complex.

Another embodiment of the invention is directed to tridentate pincer ligand metal complexes that are tetra-anionic pincer ligand metallacycloalkylene complexes of a group 5-7 transition metal such as W. The tetra-anionic OCO pincer ligand can be independently substituted at any carbon not bonded to the O's of the OCO coordination sites with H, methyl, ethyl, n-propyl, i-propyl, n-butyl, i-butyl, t-butyl, or $C_5$-$C_{20}$ alkyl, such that near planarity of the tetra-anionic pincer ligand can be achieved in the complex. The metallacycloalkylene can be substituted with methyl, ethyl, n-propyl, i-propyl, n-butyl, i-butyl t-butyl, $C_5$ to $C_{20}$ alkyl, phenyl, naphthyl, $C_{13}$ to $C_{22}$ aryl. One or two other ligands, either neutral molecules or anions, can be attached to the metal.

Another embodiment of the invention is directed to a method for preparation of tetra-anionic pincer-ligand supported metallacycloalkylene complexes from the trianionic pincer ligand supported metal-alkylidyne complexes, according to an embodiment of the invention.

Another embodiment of the invention is directed to the use of the tridentate pincer ligand metal complexes as initiators for the polymerization of alkynes. High molecular weight polymers are formed at high rates using the tridentate pincer ligand metal complexes. In an embodiment of the invention the poly(alkyne) is a macrocyclic poly(alkyne).

DETAILED DISCLOSURE

Figure 1:
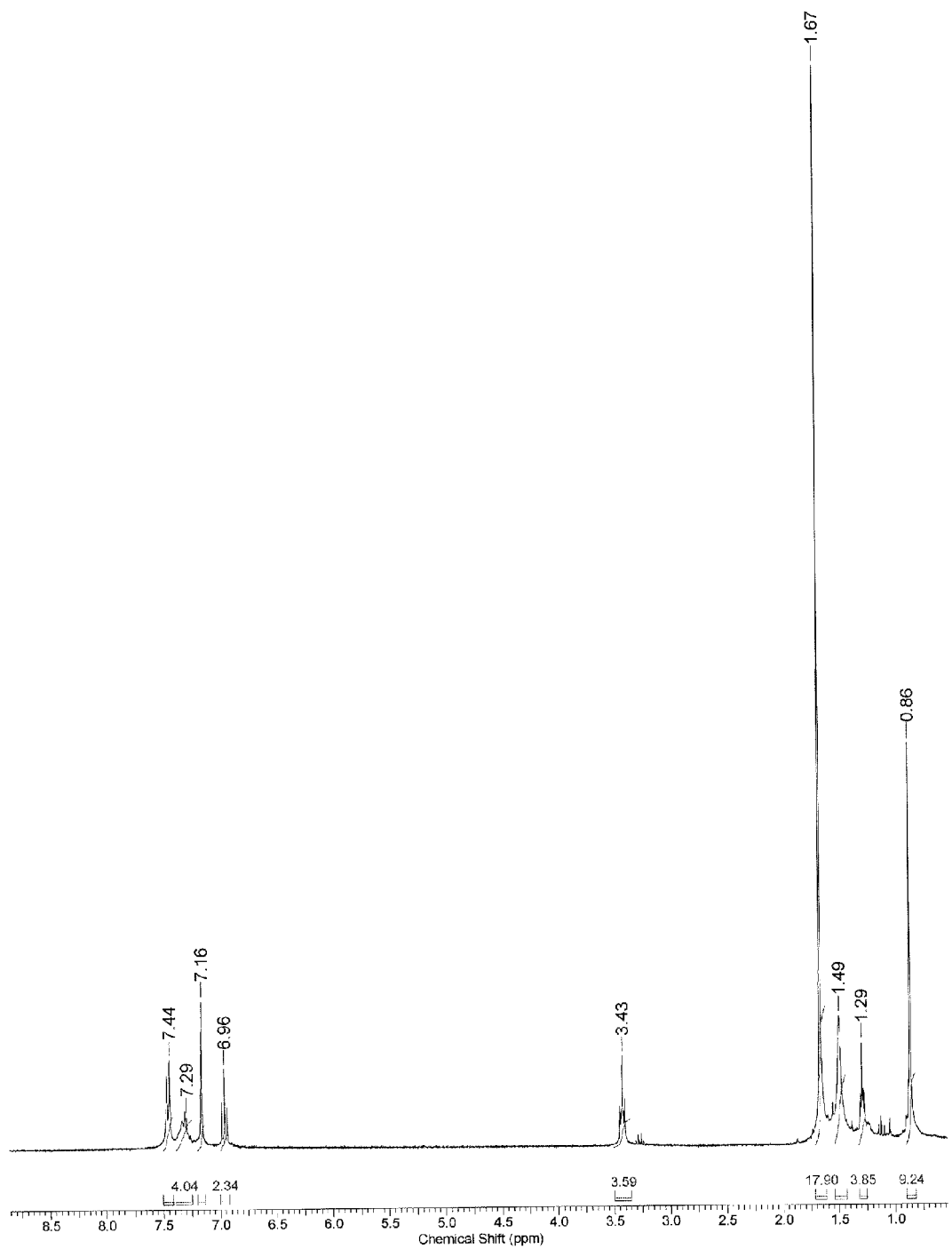
FIG. 1 shows a $^1H$ NMR spectrum of [$^tBuOCHO$]W≡CC$(CH_3)_3(O^tBu)$(THF) (1) in $C_6D_6$ at 25° C.

An embodiment of the invention is directed to tridentate pincer ligand supported metal complexes that are either trianionic pincer ligand supported metal-alkylidyne complexes or tetra-anionic pincer-ligand supported metallacycloalkylene complexes that are formed from trianionic pincer ligand supported metal-alkylidyne complexes and alkynes. Another embodiment of the invention is directed to a method to prepare the trianionic pincer ligand supported metal-alkylidyne complexes. Another embodiment of the invention is a method of polymerizing an alkyne by employing a trianionic pincer ligand supported metal-alkylidyne complex as the polymerization catalyst.

The OCO pincer ligand contains three anionic donor atoms that complex the metal ion. The metal of the pincer ligand metal complex is an early transition metal (group 5-7) in a high oxidation state, for example W, Cr, or Mo in a +6 oxidation state. In an exemplary embodiment, the transition metal is tungsten (W). The OCO pincer ligand has the structure:

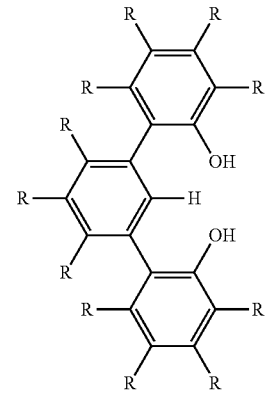

where R groups at carbons 3, 4, 5, 6, 4', 5', 6', 3", 4", 5" and 6" of the 1,1':3',1" terphenyl assembly can be H, or substituted, with an alkyl group, such as methyl, ethyl, n-propyl, i-propyl, n-butyl, i-butyl, t-butyl, or larger alkyl group, for example $C_5$-$C_{20}$, or any other substituents that do not compete for the formation of the metal-alkylidyne M≡C bond of the trianionic pincer ligand supported metal-alkylidyne complex, for example, a substituent that can form a chelate toward the metal, alone or in combination with one of the OH groups of the OCO pincer ligand. Among the other substituents on the OCO pincer ligand, R may be groups that permit the attachment of the OCO pincer ligand, or a trianionic pincer ligand supported metal-alkylidyne complex prepared therefrom, to a polymer or resin, for example a carboxylic acid, carboxylic ester, amine, thiol, epoxy, haloalkyl, hydroxy, or other reactive group in the 4, 5, 5', 4", or 5" positions. Large R groups at carbons 6, 4', 6', and 6" of the OCO pincer ligand precursor can oblige the aromatic rings to be out of plane to a significant degree and inhibit the formation of the desired trianionic pincer ligand supported metal-alkylidyne complex, and, generally, are not appropriate for preparation of the trianionic pincer ligand supported metal-alkylidyne complexes, according to embodiments of the invention. Other ligands can be attached to the trianionic pincer ligand supported metal-alkylidyne complex, including: anionic ligands, such as alkoxy, amido, alkyl amido, dialkylamido, and halo; and neutral ligands, such as ether, tetrahydrofuran, pyridine, phosphine, thioether, thiophene, and selenophine. The trianionic pincer ligand supported metal-alkylidyne complex, according to an embodiment of the invention, can be the anion of a salt with an appropriate cation.

A trianionic pincer ligand supported metal-alkylidyne complex, according to an embodiment of the invention, has the structure:

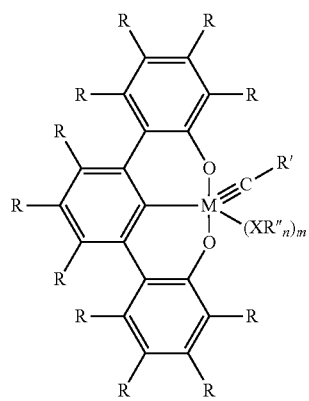

where: R is, independently, H, methyl, ethyl, n-propyl, i-propyl, n-butyl, i-butyl t-butyl, or larger alkyl, or any other substituent that does not inhibit formation of the metal-alkylidyne M≡C bond of the trianionic pincer ligand supported metal-alkylidyne complex; R' is methyl, ethyl, n-propyl, i-propyl, n-butyl, i-butyl, t-butyl, $C_5$-$C_{22}$ alkyl, phenyl, naphthyl, or $C_{13}$-$C_{22}$ aryl; X, independently, can be O, N, S, P, or Se; R", independently, is methyl, ethyl, n-propyl, i-propyl, n-butyl, i-butyl, t-butyl, $C_5$-$C_{22}$, phenyl, naphthyl, $C_{13}$-$C_{22}$ aryl, or two R" is a $C_4$-$C_6$ alkylene combined with a single X as a heterocycle; n is 1 to 3 depending on X; m is 1 to 2; and M is a group 5-7 transition metal.

In an embodiment of the invention, the trianionic pincer ligand supported metal-alkylidyne complex is synthesized from a dianionic diphenolate metal-alkylidyne having a leaving group on the metal. A base is added to deprotonate the 2'-H of the dianionic diphenolate OCO pincer ligand precursor to form the M-$C_{pincer}$ bond, while leaving the metal-alkylidyne intact. The dianionic diphenolate metal-alkylidyne can be formed by reaction between a trialkoxy-metal-alkylidyne with a 2'H-terphenyl diol, generally in an aprotic polar solvent, for example, an ether such as tetrahydrofuran. An exemplary dianionic diphenolate metal-alkylidyne, [$^t$BuOCHO]W≡CC(CH$_3$)$_3$(O$^t$Bu)(THF) (1), as indicated in equation I, below, can be formed by alcohol exchange between a trialkoxy metal-alkylidyne, ($^t$BuO)$_3$W≡C$^t$Bu, and a terphenyl diol, [$^t$BuOCO]H$_3$, in a polar aprotic solvent, tetrahydrofuran (THF). Isolation of the dianionic diphenolate metal-alkylidyne, such as 1, is advantageous, although not required, during a preparation of a desired trianionic pincer ligand supported metal-alkylidyne complex, as side products and unconverted reagents can complicate subsequent synthetic steps.

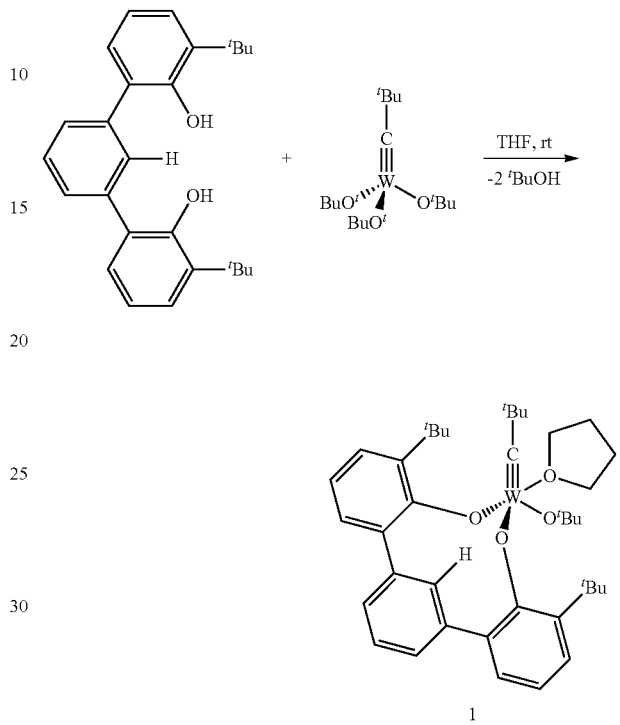

Subsequently, a base, such as the mild base triphenylphosphorane (PPh$_3$=CH$_2$), is used to deprotonate the 2'C—H of the dianionic diphenolate metal-alkylidyne and form a trianionic pincer ligand supported metal-alkylidyne complex as a salt, according to an embodiment of the invention. Other bases that can be used include, but are not limited to, methyllithium, n-butyllithium, imidazole, pyrazole, pyridine, and 1,8-diazabicyclo[5.4.0]undec-7-ene. This is illustrated in Equation II, below, where 1 is combined with an equivalent of triphenylphosphorane to precipitate the corresponding trianionic pincer ligand supported metal-alkylidyne salt, {[$^t$BuOCO]W≡CC(CH$_3$)$_3$(O$^t$Bu)}{PPh$_3$CH$_3$} (2).

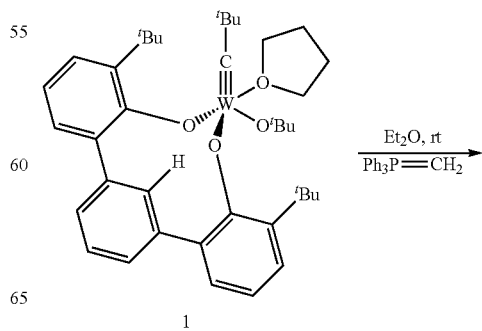

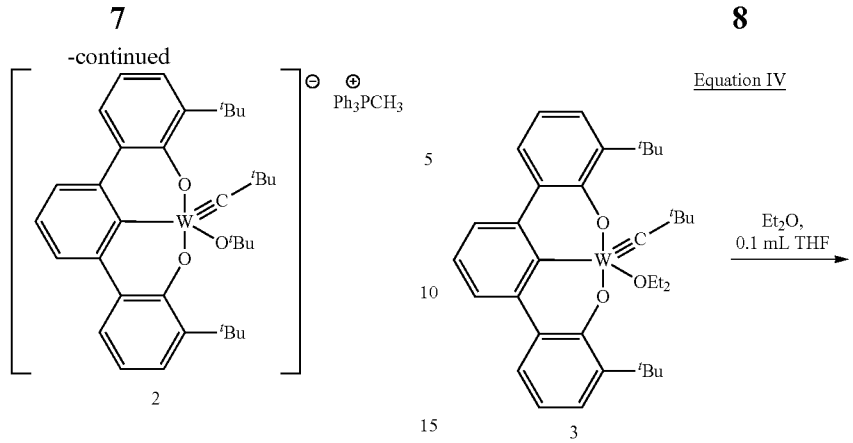

Equation IV

In a subsequent reaction, the trianionic pincer ligand supported metal-alkylidyne salt may be combined with a strong electrophile, such as, an alkyl-triflate or alkyl-tetrafluoroborate, to yield a different trianionic pincer ligand supported metal-alkylidyne complex, according to an embodiment of the invention. This step of the method for preparation of a second trianionic pincer ligand supported metal-alkylidyne complex, according to an embodiment of the invention, is shown in Equation III, below, where 2 is combined with methyl-triflate to form the trianionic pincer ligand supported metal-alkylidyne complex [$^t$BuOCO]W≡CC(CH$_3$)$_3$(Et$_2$O) (3), phosphonium triflate, and methyl$^t$butylether.

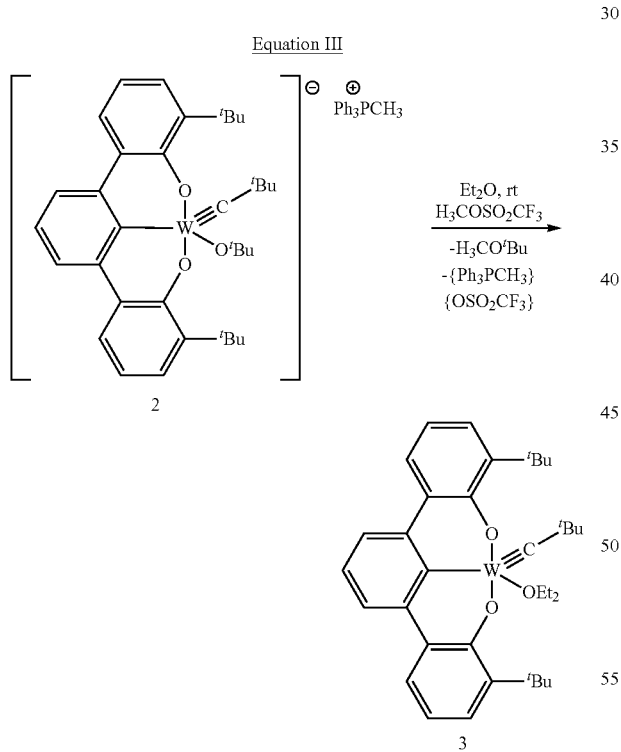

Equation III

Depending upon the solvent used in the preparation, or to which the product trianionic pincer ligand supported metal-alkylidyne complex is exposed, the structure of the trianionic pincer ligand supported metal-alkylidyne complex can vary. For example, where 3 is exposed to a mixture of diethyl ether and THF, a different trianionic pincer ligand supported metal-alkylidyne complex, which includes two THF ligands, can be isolated, as indicated in Equation IV, below.

In an embodiment of the invention, upon addition of an alkyne to a trianionic pincer ligand supported metal-alkylidyne complex, conversion occurs into a tetra-anionic pincer-ligand supported metal-alkyne or, as shown below, a tetra-anionic pincer-ligand supported metallacycloalkylene complex of the structure:

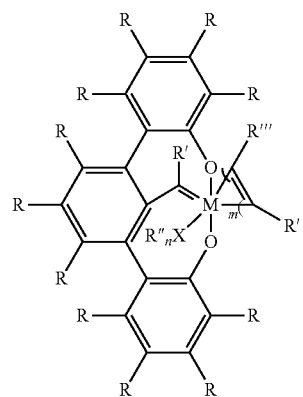

where: R is, independently, H, methyl, ethyl, n-propyl, i-propyl, n-butyl, i-butyl t-butyl, or larger alkyl, or any other substituent that does not inhibit formation of the tetra-anionic pincer-ligand supported metallacycloalkylene; R' is, independently, methyl, ethyl, n-propyl, i-propyl, n-butyl, i-butyl, t-butyl, $C_5$-$C_{22}$ alkyl, phenyl, naphthyl, $C_{13}$-$C_{22}$ aryl, substituted aryl, or trimethylsilyl; R''' is H or methyl; X, independently, is O, N, S, P, or Se; R'', independently, can be methyl, ethyl, n-propyl, i-propyl, n-butyl, i-butyl, t-butyl, $C_5$-$C_{22}$, phenyl, naphthyl, $C_{13}$-$C_{22}$ aryl, or two R'' are $C_4$-$C_6$ alkylene combined with a single X as a heterocycle; n is 1 to 3 depending on X; m is n is 1 to 2; and M is a group 5-7 transition metal. When R' is substituted aryl, one or more substituents can be fluoro, $C_1$-$C_3$ alkoxy, or trifluoromethyl.

In an embodiment of the invention, a tetra-anionic pincer-ligand supported metallacycloalkylene complex is metallacyclopropylene complex formed by the addition of an alkyne to the trianionic pincer ligand supported metal-alkylidyne complex. In an exemplary embodiment of the invention, the trianionic pincer ligand supported metal-alkylidyne complex 4 is contacted with an alkylene, as illustrated with phenylacetylene in equation V, below, to form a pair of isomeric tetra-anionic pincer-ligand supported metallacyclopropene complexes, 5-$^t$Bu and 5-Ph, upon addition. Other alkylenes can give exclusively one isomer, for example methylpropriolate. The isomeric tetra-anionic pincer-ligand supported metallacyclopropene complexes can be isolated or used as a mixture for catalysis of alkyne polymerization.

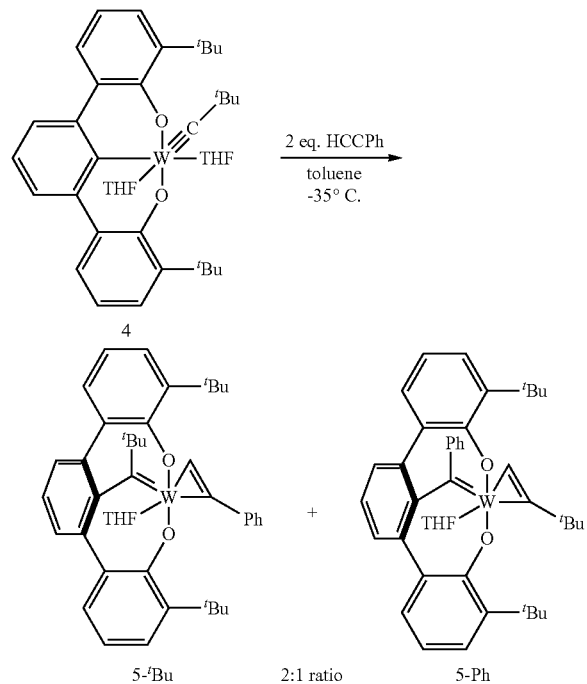

An embodiment of the invention is directed to a method for the polymerization of alkynes using a trianionic pincer ligand supported metal-alkylidyne complex or a tetra-anionic pincer-ligand supported metallacyclopropene complex as the polymerization catalyst, as indicated in Equation VI, below. The poly(alkyne)s prepared by this method can display one or more geometries across the resulting double bonds of the poly(alkyne) backbone. The all cis alkylene chain, indicated by Equation V, is for illustrative purposes only, and is not intended to suggest the geometry to be expected upon polymerization of all possible monomers, using all possible trianionic pincer ligand supported metal-alkylidyne complexes, or under any set of reaction conditions. The polymerization reaction occurs upon combining the trianionic pincer ligand supported metal-alkylidyne complex to an alkyne monomer, in a fluid state, which can be in solution. The alkyne can be unsubstituted, monosubstituted, or disubstituted. The trianionic pincer ligand supported metal-alkylidyne complex can be a neutral complex or an anion of a salt when employed with a strong electrophile, such as methyl triflate. The polymerization can be carried out at relatively mild conditions, for example, ambient temperatures at dry conditions under an inert atmosphere. The polymerization can occur with a large turnover of monomer per catalyst, a high degree of polymerization, and a high yield of polymer. As would be expected by those skilled in the art, the rate of polymerization and the practical conversion varies with the nature of the monomer, catalyst and conditions for the polymerization. In an embodiment of the invention, the resulting poly(alkyne) can be a cyclic polymer.

Equation VI

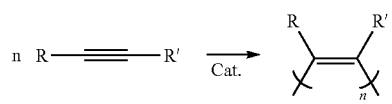

Methods and Materials

Unless specified otherwise, all manipulations were performed under an inert atmosphere using glove-box techniques. Tetrahydrofuran (THF), pentane, diethyl ether (Et$_2$O), and toluene were dried using a GlassContour drying column. C$_6$D$_6$ (Cambridge Isotopes) was dried over sodium-benzophenone ketyl, distilled or vacuum transferred and stored over 4 Å molecular sieves. CDCl$_3$ (Cambridge Isotopes) was dried over anhydrous CaCl$_2$, vacuum transferred, and stored over 4 Å molecular sieves. ($^t$BuO)$_3$W≡CC(CH$_3$)$_3$ was purchased from Strem Chemicals Inc. and used as received, or was synthesized according to literature procedures. Methyl triflate (MeOTf) was purchased from TCI Chemicals and used as received. [$^t$BuOCO]H$_3$ and Ph$_3$P=CH$_2$ were prepared according to literature procedures. Phenyl acetylene, 1-phenyl-1-propyne, 4-methoxyphenyl acetylene, and 4-fluorophenylacetylene were purchased from Sigma-Aldrich, degassed, dried over activated 4 Å molecular sieves, and filtered through a basic alumina column prior to use. NMR spectra were obtained on Varian Mercury 300 MHz, Varian Mercury Broad Band 300 MHz, or Varian INOVA2 500 MHz spectrometers. Chemical shifts are reported in δ (ppm). For $^1$H and $^{13}$C NMR spectra, the residual solvent peaks were used as an internal reference. FT-IR spectra were recorded on a Thermo scientific instrument. Gel Permeation chromatography (GPC) was performed with a Waters Associates GPCV2000 liquid chromatography system using an internal differential refractive index detector (DRI) and two Waters Styragel® HR-5E columns with HPLC grade THF as the mobile phase at a flow rate of 1.0 mL/min. Injections were made at 0.1% w/v sample concentration using a 220.5 µL injection volume. Retention times were calibrated against narrow molecular weight polystyrene standards (Polymer Laboratories; Amherst, Mass.).

Synthesis of [$^t$BuOCHO]W≡C(CH$_3$)$_3$(O$^t$Bu)(THF) (1)

As illustrated in Equation I, above, in a nitrogen filled glove box, a glass vial was charged with [$^t$BuOCO]H$_3$ (140 mg, 0.37 mmol) in THF (1 mL); and subsequently cooled to −35° C. In a second vial, ($^t$BuO)$_3$W≡CC(CH$_3$)$_3$ (200 mg, 0.42 mmol) was dissolved in THF (1 mL) and the solution was added dropwise to the first solution while stirring. As the solution warmed to room temperature, a gradual color change from brown to dark yellow was observed. Stirring was continued for 30 min at room temperature. A tacky dark yellow material was obtained after removal of volatiles. Cold pentane (4 mL) was added to form a brown suspension, from which a bright yellow precipitate of 1 was filtered. The filtrate was washed with additional cold pentane. Single crystals were obtained by cooling a dilute pentane solution at −35° C. for 12 h; yield (206 mg, 72%). $^1$H NMR (300 MHz, C$_6$D$_6$, δ (ppm)): 8.94 (s, tol-d$_8$, −65° C., C$_{ipso}$—H), 7.46 (d, J=7.8 Hz, 4H, Ar—H), 7.33-7.27 (m, 4H, Ar—H), 6.96 (t, J=8.0 Hz, 2H, Ar—H), 3.43 (m, 4H, OCH$_2$CH$_2$/THF), 1.67 (s, 18H, —C(CH$_3$)$_3$), 1.49 (bs, 911, —OC(CH$_3$)$_3$), 1.29 (m, 4H, OCH$_2$CH$_2$/THF), 0.86 (s, 9H, W≡CC(CH$_3$)$_3$). $^{13}$C{$^1$H}NMR (75.36 MHz, C$_6$D$_6$, δ (ppm)): 297.1 (s, W≡CC(CH$_3$)$_3$), 165.2 (s, C, aromatic), 144.8 (s, C, aromatic), 138.0 (s, C, aromatic), 130.5 (s, C, aromatic), 127.5 (s, C, aromatic), 126.9 (s, C, aromatic), 121.7 (s, C, aromatic), 80.7 (s, —OC(CH$_3$)$_3$), 50.3 (s, W≡CC(CH$_3$)$_3$), 35.7 (s, —C(CH$_3$)$_3$), 32.9 (s, W≡CC(CH$_3$)$_3$), 32.2 (s, —OC(CH$_3$)$_3$), 31.3 (s, —C(CH$_3$)$_3$). Anal. Calcd for C$_{35}$H$_{46}$O$_3$W: C, 60.18; H, 6.64. Found: C, 59.76, H, 6.74.

Figure 2:
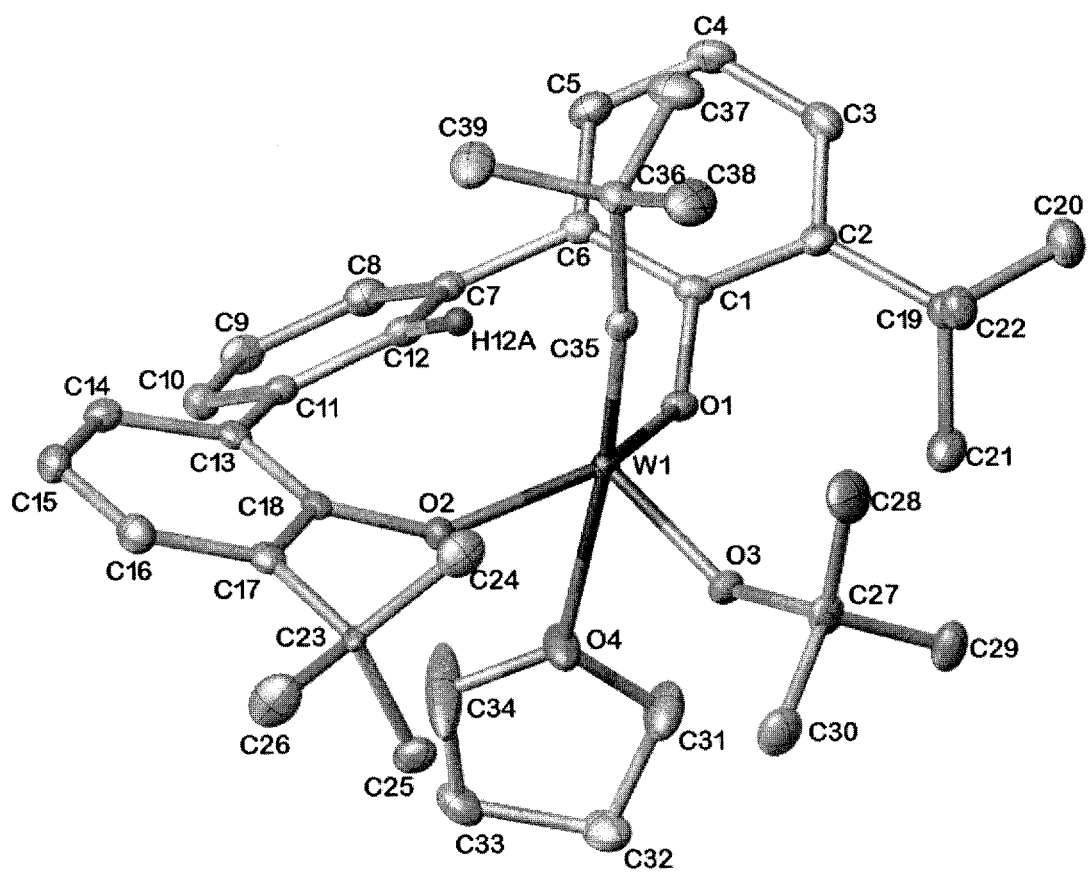
FIG. 2 shows the single crystal x-ray diffraction determined structure of [$^tBuOCHO$]W≡CC$(CH_3)_3(O^tBu)$(THF) (1), where hydrogen atoms, with the exception of H-12a, are omitted for clarity.
Figure 3:
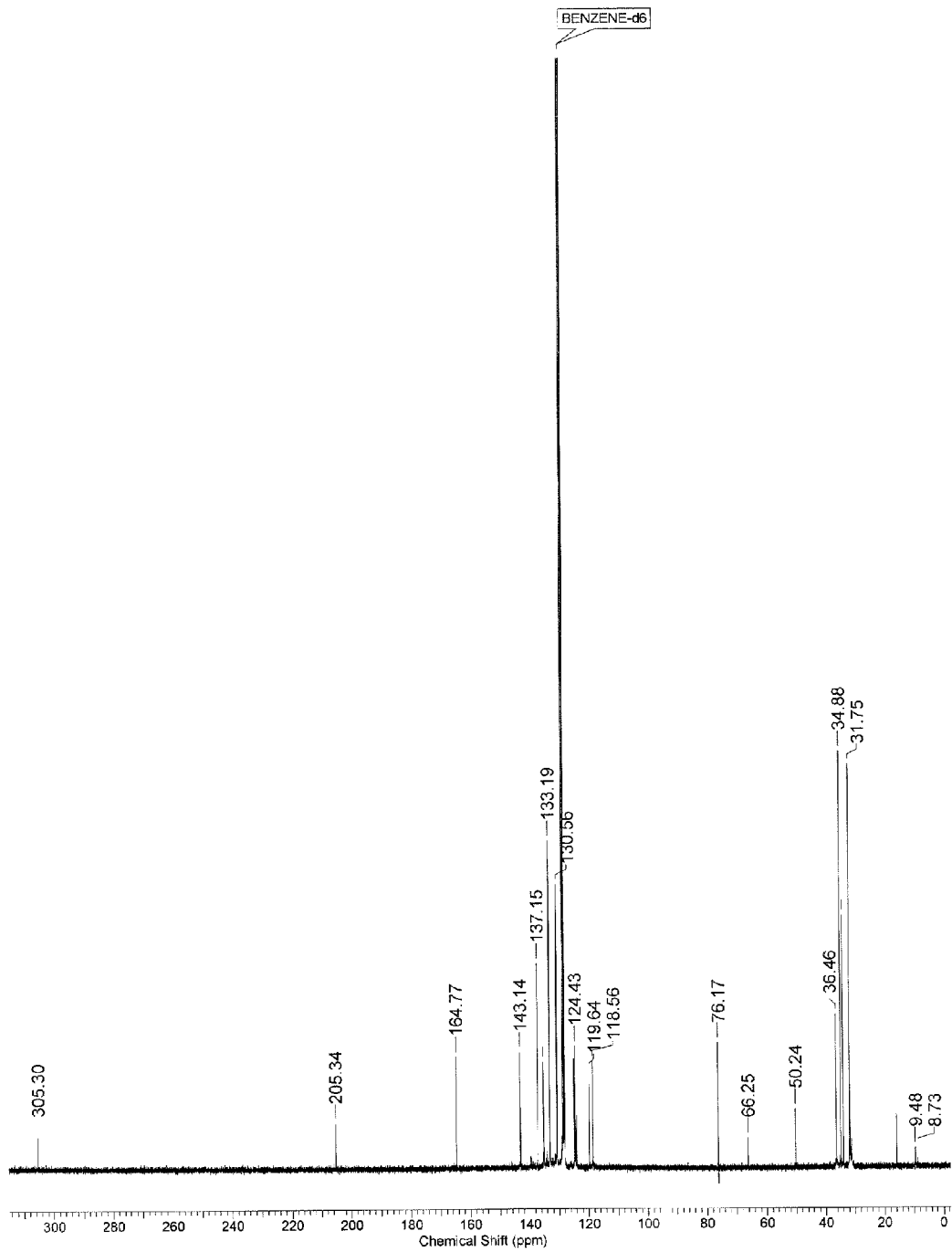
FIG. 3 shows a $^{13}C\{^1H\}$ NMR spectrum in $C_6D_6$ at 25° C. for $\{[^tBuOCO]W≡CC(CH_3)_3(O^tBu)\}\{Ph_3PCH_3\}$ (2), according to an embodiment of the invention.
Figure 4:
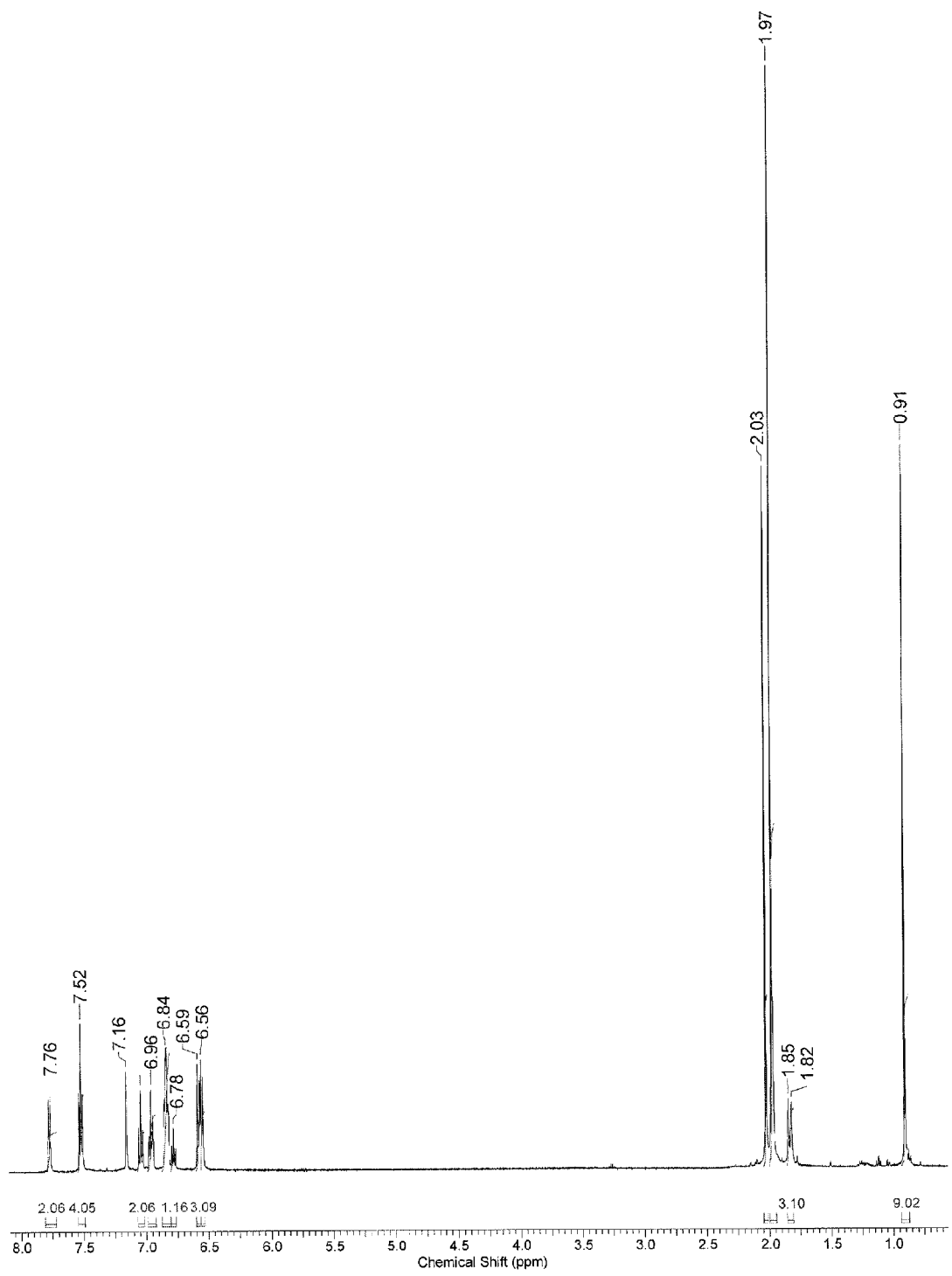
FIG. 4 shows a $^1H$ NMR spectrum of $\{[^tBuOCO]W≡CC(CH_3)_3(O^tBu)\}\{Ph_3PCH_3\}$(2), according to an embodiment of the invention, in $C_6D_6$ at 25° C.
Figure 5:
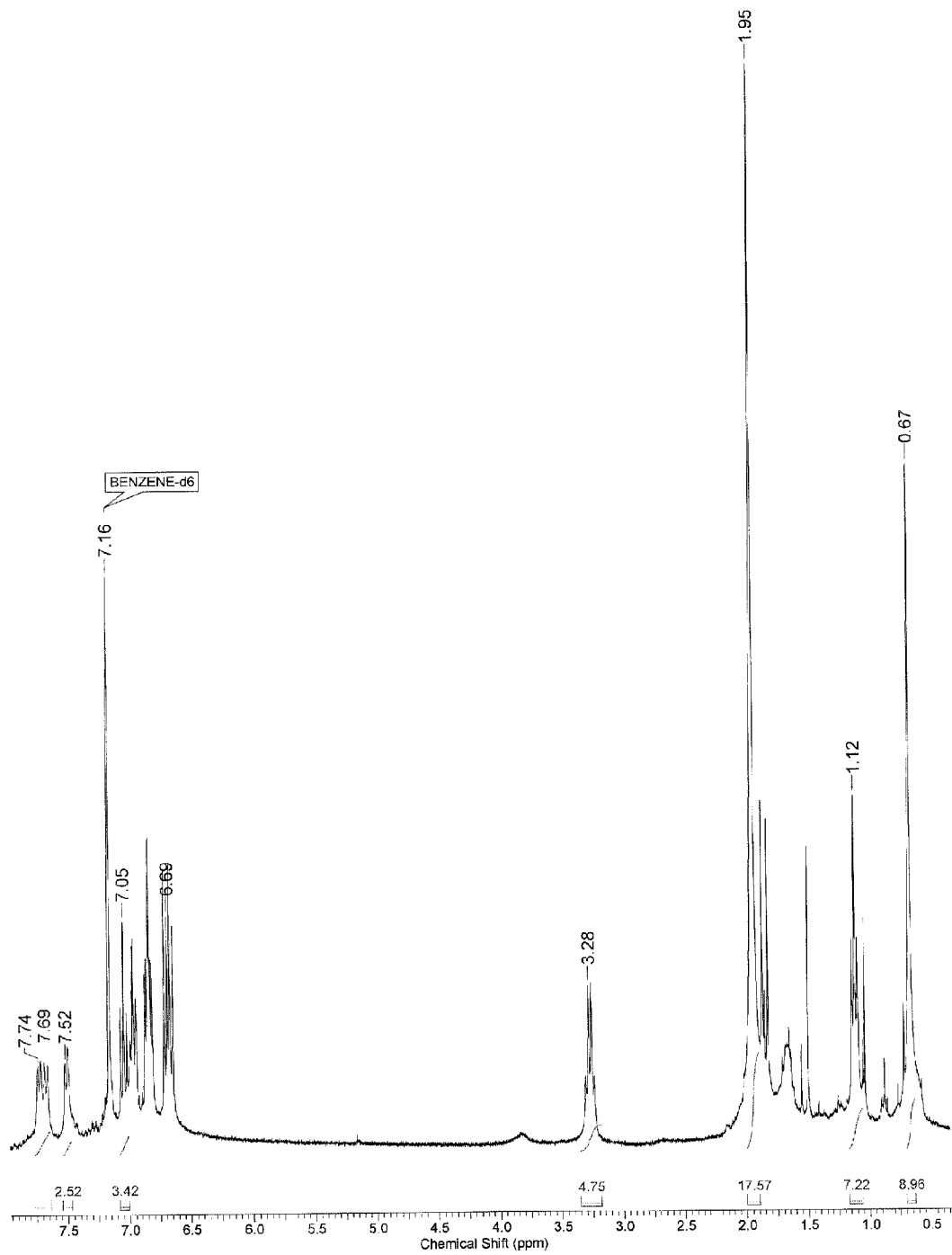
FIG. 5 shows a $^1H$ NMR spectrum of [$^tBuOCO$]W≡CC$(CH_3)_3(Et_2O)$ (3), according to an embodiment of the invention, in $C_6D_6$ at 25° C.

FIG. 2 shows the structure of 1, as determined by a single crystal X-ray diffraction experiment, in which complex 1 crystallizes in a P1$^-$ space group. X-Ray Intensity data were collected at 100 K on a Bruker SMART diffractometer using MoKα radiation (λ=0.71073 Å) and an APEXII CCD area detector. Raw data frames were analyzed by program SAINT and integrated using 3D profiling algorithms. Reducing the resulting data produced the hkl reflections and their corresponding intensities and estimated standard deviations. The data were corrected for Lorentz and polarization effects and numerical absorption corrections were applied based on indexed and measured faces.

The structure was solved and refined in SHELXTL6.1, using full-matrix least-square refinements. The non-H atoms were refined with anisotropic thermal parameters and all of the H atoms were calculated in idealized positions and refined riding on their parent atoms. A small electron density peak near the C23 $^t$Bu group could not be attributed to any reasonable disorder. In the final cycle of refinement, 8054 reflections (of which 7347 are observed with I>2σ(I)) were used to refine 409 parameters and the resulting R$_1$, wR$_2$ and S (goodness of fit) were 2.54%, 5.37% and 1.060, respectively. The refinement was carried out by minimizing the wR$_2$ function using F$^2$ rather than F values. R$_1$ was calculated to provide a reference to the conventional R value but its function was not minimized. The complex is C$_s$-symmetric in the solid state and the 5-coordinate W(VI) ion possesses a distorted trigonal bipyramidal geometry, with an Addison parameter of τ=0.85. The pincer ligand chelates through the phenolate donors which are situated at equatorial sites with a bite angle of 135.65(9)°. Compound 1 represents the first structurally characterized compound in which a ligand is attached to the metal center in a dianionic form and has an intact W≡CR fragment.

Synthesis of {[$^t$BuOCO]W≡CC(CH$_3$)$_3$(O$^t$Bu)}{Ph$_3$PCH$_3$} (2)

As illustrated in Equation II, above, a glass vial was charged with 1 (206 mg, 0.267 mmol) and Et$_2$O (1 mL), and subsequently cooled to −35° C. A solution of Ph$_3$P═CH$_2$ (74 mg, 0.267 mmol) in Et$_2$O (0.5 mL) was prepared and added to the cold solution. The resulting mixture was warmed to 25° C. where the solution changed in color from a "dark" yellow to "canary" yellow. The solution was stirred for 45 min at room temperature, during which time, the salt, 2, precipitated as a yellow solid. The product was filtered, and the filtrate was washed with pentanes (3×1 mL) to yield (216 mg, 83%). $^1$H NMR (500 MHz, C$_6$D$_6$, δ (ppm)): 7.77 (d, J=7.2 Hz, 2H, Ar—H), 7.52 (t, J=7.2 Hz, 411, Ar—H), 7.04 (d, J=7.3 Hz, 2H, Ar—H), 6.96 (t, J=7.9 Hz, 3H, Ar—H), 6.84 (dt, J=2.5 Hz, J=7.7 Hz, 6H, Ar—H), 6.78 (t, J=7.3 Hz, 1H, Ar—H), 6.58 (d, J=7.9 Hz, 3H, Ar—H), 6.55 (d, J=7.7 Hz, 3H, Ar—H), 2.03 (s, 9H, —OC(CH$_3$)$_3$), 1.97 (s, 18H, —C(CH$_3$)$_3$), 1.83 (d, J$_{PH}$=12.8 Hz, 3H, P—CH$_3$), 0.91 (s, 9H, W≡CC(CH$_3$)$_3$). $^{13}$C{$^1$H} NMR (126 MHz, C$_6$D$_6$, δ (ppm)): 305.3 (s, W≡CC(CH$_3$)$_3$), 205.3 (s, W—C$_{pincer}$) 164.8 (s, C, aromatic), 143.1 (s, C, aromatic), 137.2, 135.2 (d, J$_{CP}$)=2.7 Hz, C, aromatic), 133.1 (d, J$_{CP}$=10.1 Hz, C, aromatic), 130.7 (d, J$_{CP}$=12.8 Hz, C, aromatic), 127.9 (s, C, aromatic), 124.7 (s, C, aromatic), 124.4 (s, C, aromatic), 124.0 (s, C, aromatic), 119.6 (s, C, aromatic), 118.5 (d, J$_{CP}$=7.3 Hz, C, aromatic), 76.2 (s, —OC(CH$_3$)$_3$), 50.2 (s, W≡CC(CH$_3$)$_3$), 36.5 (s, —C(CH$_3$)$_3$), 34.9 (—C(CH$_3$)$_3$), 34.0 (s, W≡CC(CH$_3$)$_3$), 31.8 (s, —C(CH$_3$)$_3$), 9.1 (d, J$_{CP}$=56.7 Hz). $^{31}$P{$^1$H} NMR (121M Hz, C$_6$D$_6$, δ (ppm)): 21.6. Anal. Calcd for C$_{54}$H$_{63}$O$_3$PW: C, 66.53; H, 6.51. Found: C, 66.57, H, 6.51.

Attempts to obtain single crystals of complex 2 were unsuccessful. The combination of $^1$H, $^{13}$C, $^{31}$P, and correlation experiments using NMR spectroscopy and combustion analysis allowed for unambiguous identification.

Synthesis of [$^t$BuOCO]W≡$_1$W≡CC(CH$_3$)$_3$(Et$_2$O) (3)

As illustrated in Equation III, above, a glass vial was charged with 2 (118 mg, 0.121 mmol) and Et$_2$O (1 mL); and subsequently cooled to −35° C. A solution of MeOTf (13.1 μL, 0.121) in Et$_2$O (0.5 mL) was added dropwise to the cold suspension of 2. The resulting solution was warmed to 25° C. and stirred until a color change from "canary" yellow to "dark" orange occurred. After stirring for 1 h, phosphonium triflate precipitates as a white solid and was removed from the solution via filtration. All volatiles were removed from the solution to yield an orange solid, which was triturated with pentane. Single crystals of 3 were obtained by cooling a dilute diethyl ether solution of the orange solid at −35° C. for 3 d; yield (56 mg, 66%). $^1$H NMR (300 MHz, C$_6$D$_6$, δ(ppm)): 7.72 (d, J=6.0 Hz, 2H, Ar—H), 7.67 (d, J=6.0 Hz, 2H, Ar—H), 7.51 (d, J=6.0 Hz, 2H, Ar—H), 7.05 (t, J=6.0 Hz, 1H, Ar—H), 6.69 (t, J=6 Hz, 2H, Ar—H), 3.27 (q, J=6 Hz, 4H, OCH$_2$CH$_3$), 1.95 (s, 18H, —C(CH$_3$)$_3$, 1.12 (t, J=6.0 Hz, 6H, OCH$_2$CH$_3$), 0.67 (s, 9H, W≡CC(CH$_3$)$_3$).

Figure 6:
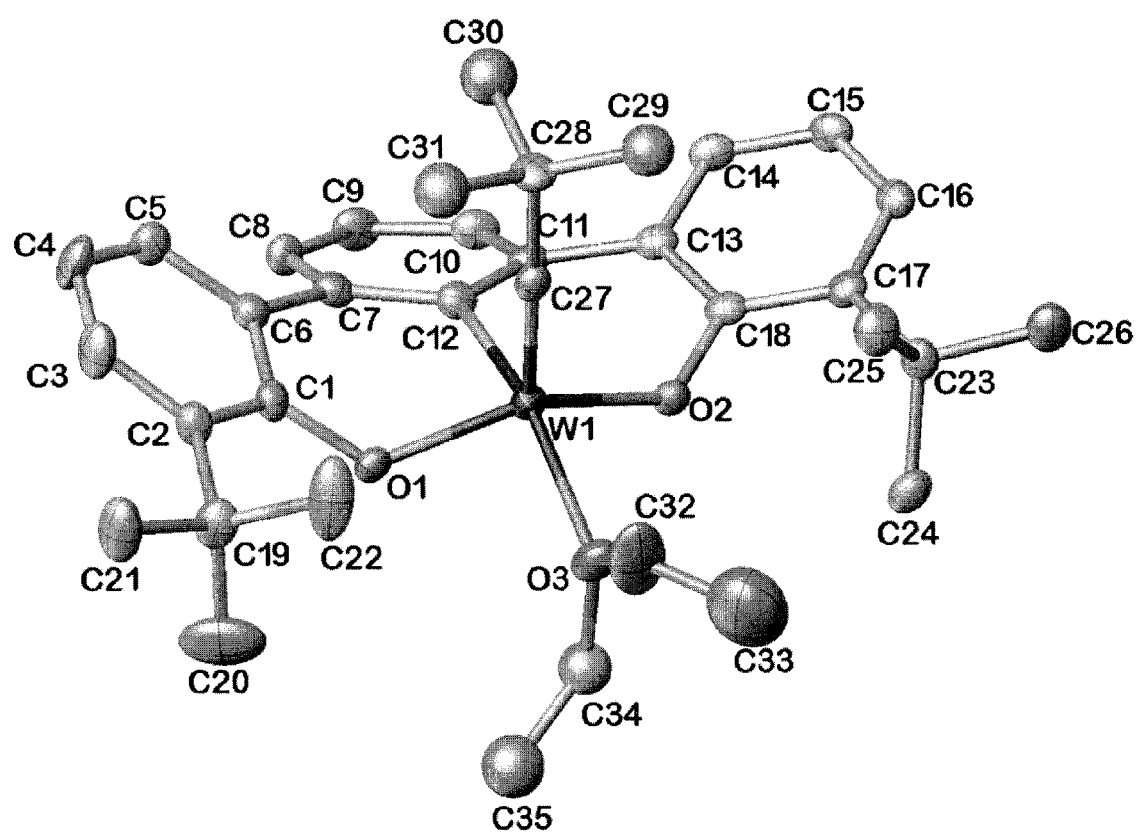
FIG. 6 shows the single crystal x-ray diffraction determined structure of [$^tBuOCO$]W≡CC$(CH_3)_3(Et_2O)$ (3), according to an embodiment of the invention, where hydrogen atoms are omitted for clarity.

FIG. 6 represents the solid state molecular structure of complex 3, which crystallizes in the monoclinic space group P2(1)/n. X-Ray Intensity data were collected at 100 K on a Bruker DUO diffractometer using MoKα radiation (λ=0.71073 Å) and an APEXII CCD area detector. Raw data frames were analyzed by program SAINT, and were integrated using 3D profiling algorithms. Reducing the resulting data produced the hkl reflections and their corresponding intensities and estimated standard deviations. The data were corrected for Lorentz and polarization effects and numerical absorption corrections were applied based on indexed and measured faces. The structure was solved and refined in SHELXTL6.1, using full-matrix least-squares refinement. The non-H atoms were refined with anisotropic thermal parameters and all of the H atoms were calculated in idealized positions and refined riding on their parent atoms. There are two disordered regions in the complex. In one, the three methyl groups on C28 were refined in two parts. The other part includes the disordered coordinated ether ligand. In each case, the site occupation factors of related parts were dependently refined. In the final cycle of refinement, 7070 reflections (of which 5138 are observed with I>2σ(I)) were used to refine 349 parameters and the resulting R$_1$, wR$_2$ and S (goodness of fit) were 2.62%, 4.94% and 0.912, respectively. The refinement was carried out by minimizing the $wR_2$ function using $F^2$ rather than F values. $R_1$ was calculated to provide a reference to the conventional R value but its function was not minimized. The single crystal structure reveals that the trianionic pincer ligand binds to the W(VI) ion in a terdentate meridional fashion. The complex is $C_s$-symmetric and the W(VI) ion has square pyramid geometry and yields a calculated Addison parameter (r) of 0.14. The basal plane contains the trianionic pincer and a coordinated ether molecule. The bond angles in the basal plane comprise of O1-W1-O3=88.67(9)°, O2-W1-O3=87.66(9)°, O2-W1-C12=85.41(1)° and O1W1-C12=85.34(1)°.

Synthesis of [$^t$BuOCO]W≡CC(CH$_3$)$_3$(THF)$_2$ (4)

As illustrated in Equation IV, above, a glass vial was charged with 2 (115 mg, 0.164 mmol) and Et$_2$O (5 mL) to provide an orange suspension. THF (0.1 mL) was added to precipitate phosphoniumtriflate as a white solid. The solution was filtered and concentrated under reduced pressure. Cooling the solution to −35° C. for 12 h yielded compound 4 as a "dark" red crystalline material; yield (100 mg, 78%). $^1$H NMR (500 MHz, C$_6$D$_6$, δ (ppm)): 8.00 (d, J=7.4 Hz, 2H, Ar—H), 7.84 (d, J=8.5 Hz, 2H, Ar—H), 7.46 (d, J=7.9 Hz, 2H, Ar—R), 7.35 (t, J=8.5 Hz, 1H, Ar—H), 7.05 (t, J=7.5 Hz, 2H, Ar—H), 4.07 (br, 4H, OCH$_2$CH$_2$/THF), 3.40 (br, 4H, CH$_2$CH$_2$/THF), 1.65 (s, 18H, —C(CH$_3$)$_3$), 1.45 (br, 4H, OCH$_2$CH$_2$/THF), 1.16 (br, 4H, OCH$_2$CH$_2$/THF), 0.61 (s, 9H, W≡CC(CH$_3$)$_3$). $^{13}$C{$^1$H} NMR (126 MHz, C$_6$D$_6$, δ (ppm)): 320.7 (s, W≡CC(CH$_3$)$_3$) 193.5 (s, W—C$_{ipso}$), 163.1 (s, C, aromatic), 139.2 (s, C, aromatic), 135.4 (s, C, aromatic), 134.5 (s, C, aromatic), 128.0 (s, C, aromatic), 126.4 (s, C, aromatic), 125.3 (s, C, aromatic), 124.3 (s, C, aromatic), 119.9 (s, C, aromatic), 76.8 (s, OCH$_2$CH$_2$/THF), 67.3 (s, OCH$_2$CH$_2$/THF), 48.6 (s, W≡CC(CH$_3$)$_3$), 35.3 (s, —C(CH$_3$)$_3$), 32.5 (s, W≡CC(CH$_3$)$_3$), 30.6 (s, —C(CH$_3$)$_3$), 25.6 (s, OCH$_2$CH$_2$/THF), 24.9 (s, OCH$_2$CH$_2$/THF). Anal. Calcd for C$_{39}$H$_{52}$O$_4$: C, 60.94; H, 6.82. Found: C, 60.88, H, 6.87.

A combination of $^1$H and $^{13}$C NMR spectroscopy with combustion analysis allowed the unambiguous identification of 4. X-Ray Intensity data were collected at 100 K on a Bruker DUO diffractometer using MoKα radiation (λ=0.71073 Å) and an APEXII CCD area detector. Raw data frames were analyzed by the program SAINT and integrated using 3D profiling algorithms. Reducing the resulting data produced the hkl reflections and their corresponding intensities and estimated standard deviations. The data were corrected for Lorentz and polarization effects and numerical absorption corrections were applied based on indexed and measured faces.

Figure 7:
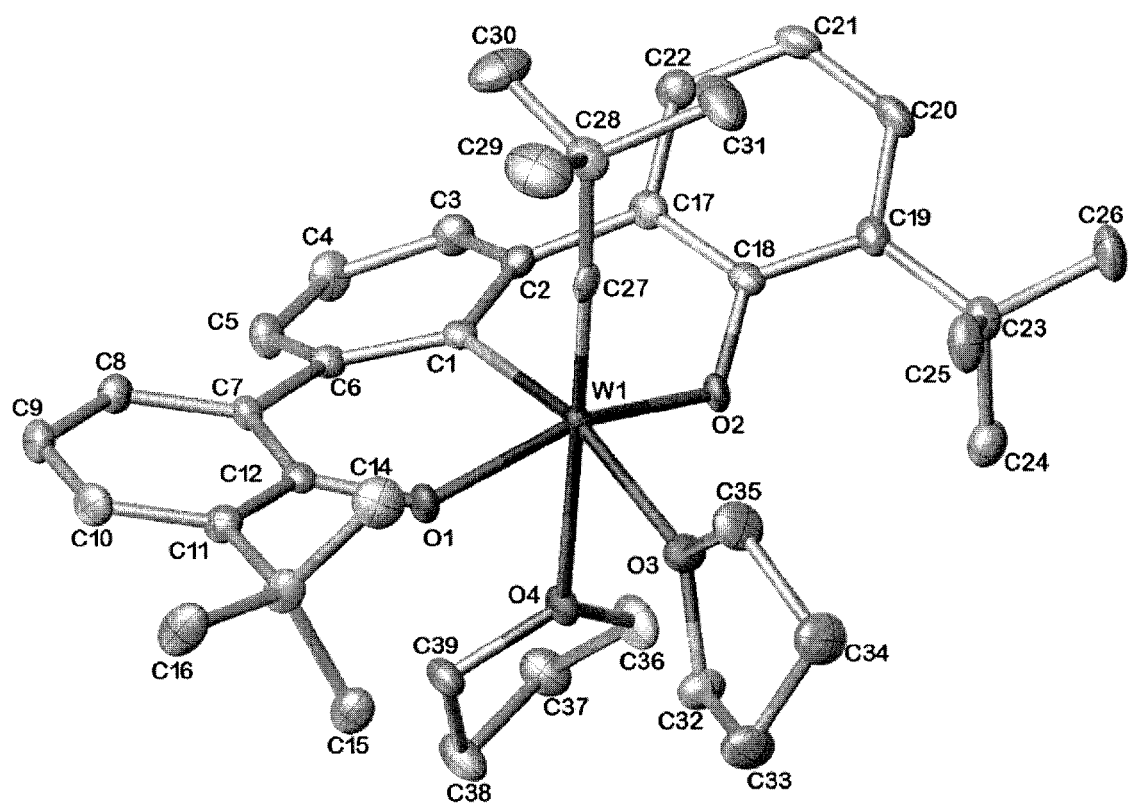
FIG. 7 shows the single crystal x-ray diffraction determined structure of [$^tBuOCO$]W≡CC$(CH_3)_3(THF)_2$ (4), according to an embodiment of the invention, where hydrogen atoms are omitted for clarity.

The crystal structure, as shown in FIG. 7, was solved and refined in SHELXTL6.1, using the full-matrix least-square refinements. The non-H atoms were refined with anisotropic thermal parameters and all of the H atoms were calculated in idealized positions and refined riding on their parent atoms. In the final cycle of refinement, 8159 reflections (of which 7035 are observed with I>2 σ(I)) were used to refine 406 parameters and the resulting $R_1$, $wR_2$ and S (goodness of fit) were 2.18%, 4.69% and 0.952, respectively. The refinement was carried out by minimizing the $wR_2$ function using $F^2$ rather than F values. $R_1$ was calculated to provide a reference to the conventional R value but its function was not minimized.

Synthesis of [O$_2$C($^t$BuC≡)W(Θ$^2$-HC≡CPh)] (5-$^t$Bu) and [O$_2$C(PhC≡)W(η$^2$-HC≡C$^t$Bu)](5-Ph)

Complex 4 reacts instantaneously with 2 equiv. of phenylacetylene in toluene-d$_8$ at −35° C. to yield [O$_2$C($^t$BuC≡)W(η$^2$-HC≡CPh)] (5-$^t$Bu) and [O$_2$C(PhC≡)W(η$^2$-HC≡C$^t$Bu)] (5-Ph) in a 2:1 ratio, along with small amounts of polyphenylacetylene (PPA) (Scheme 1). Adding Et$_2$O to the mixture of compounds selectively dissolves the two complexes, and filtering results in the separation of Et$_2$O-insoluble PPA. Adding pentane to the mixture of 5-$^t$Bu and 5-Ph selectively dissolves 5-$^t$Bu, and filtering results in the segregation of 5-Ph, a pentane-insoluble orange solid in 33% yield. The pentane soluble solution of 5-$^t$Bu was reduced under vacuum to yield a yellow solid in 40% yield.

Figure 8:
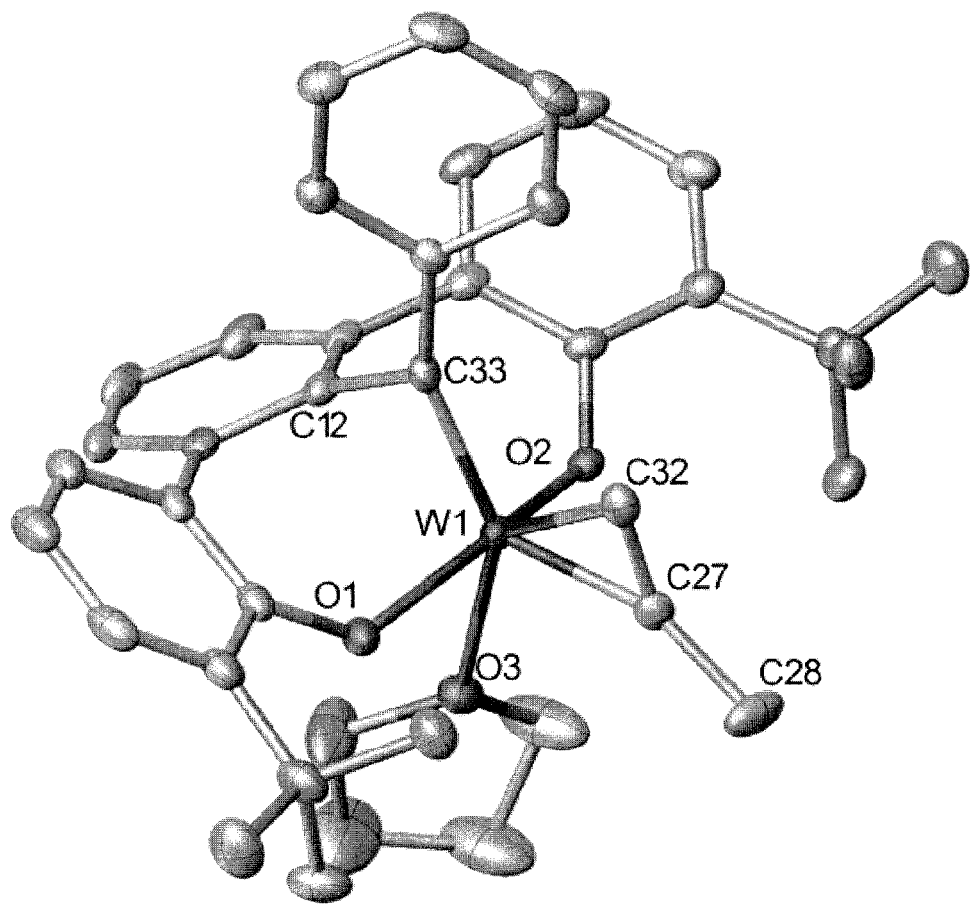
FIG. 8 shows the single crystal x-ray diffraction determined structure of [$O_2C(PhC=)$]W$(\eta^2$-HC≡C$^tBu)$] (5-Ph), according to an embodiment of the invention, where ellipsoids are presented at 50% probability with all hydrogen atoms and the methyl groups on C28 removed for clarity.

Single crystals amenable to an X-ray diffraction experiment deposit from a concentrated solution of 5-Ph in Et$_2$O at −35° C. FIG. 8 shows the molecular structure of 5-Ph with some selected bond lengths and bond angles and Table 1, below, list X-ray refinement data. In the solid state, complex 5-Ph is pseudo C$_s$-symmetric and contains a W(VI) ion in a non-standard polyhedral geometry. 5-Ph and 5-tBu feature the unusual combination of a tridentate tetra-anionic pincer-type ligand comprising two phenolate and an alkylidene connection.

Complexes 5-tBu and 5-Ph form in a 2 to 1 ratio from 1 and phenylacetylene at −35° C. As illustrated in equation VII, below, heating a solution of isolated 5-tBu in toluene-d$_8$ at 85° C. for 2.5 weeks established 5-tBu and 5-Ph in equilibrium. At equilibrium, integration of the respective protons on the η$^2$-HC≡CPh and η$^2$-HC≡$^t$Bu moieties indicates that 5-tBu and 5-Ph exist in a 17:83 ratio ($K_{eq}$=5), corresponding to an energy difference of −1.14 kcal/mol at 85° C.

TABLE 1

| X-ray crystallographic structure parameters and refinement data | | | |
|---|---|---|---|
| | 5-Ph | 6-Ph | 7A |
| formula | C$_{45}$H$_{56}$O$_{3.5}$W | C$_{48}$H$_{62}$O$_4$W | C$_{48}$H$_{50}$O$_2$W |
| formula weight | 836.75 | 886.83 | 879.79 |
| crystal system | Triclinic | Triclinic | Monoclinic |
| Space Group | P$_{\bar{1}}$ | P-1 | P2$_1$/c |
| dimensions (mm) | 0.19/0.12/0.04 | 0.17/0.13/0.05 | 0.12/0.09/0.05 |
| a (Å) | 9.4199(4) | 12.5307(3) | 9.6683(5) |
| b (Å) | 12.1830(5) | 18.2485(4) | 40.736(2) |
| c (Å) | 17.6797(7) | 19.5913(4) | 21.0306(13) |
| α (deg) | 93.621(2) | 91.056(1) | 90 |
| β (deg) | 100.409(2) | 93.582(1) | 97.047(1) |
| γ (deg) | 102.237(2) | 109.527(1) | 90 |
| volume (Å$^3$) | 1939.34(14) | 4210.28(16) | 8220.3(8) |
| Z (Å) | 2 | 4 | 8 |
| abs coeff mm$^{-1}$ | 3.018 | 2.786 | 2.851 |
| F (000) | 856 | 1824 | 3592 |
| D$_{calcd}$ (g/cm$^3$) | 1.433 | 1.399 | 1.422 |
| γ (Mo Kα) (Å) | 0.71073 | 0.71073 | 0.71073 |
| temperature (K) | 100(2) | 100(2) | 100(2) |
| θ range (deg) | 1.72 to 27.50 | 1.73 to 27.50 | 1.00 to 27.50 |
| refl collected | 53616 | 65439 | 73336 |
| indep refl [R$_{int}$] | 8897 [0.0476] | 19344 [0.0665] | 18795 [0.0534] |
| data/rest/param | 8897/0/456 | 19344/0/948 | 18795/0/986 |
| final R$_1$ indices > | R1 = 0.0262, wR2 | R1 = 0.0377, wR2 | R1 = 0.0361, wR2 |
| [I > 2σ(I)] | 0.0639 [8071] | 0.0748[1460] | 0.0577[12987] |
| R indices | R1 = 0.0302, | R1 = 0.0576, | R1 = 0.0700, wR2 |
| (all data) | wR2 = 0.0655 | wR2 = 0.0828 | wR2 = 0.0694 |
| diff peak/hole | 2.205/−2.364 | 1.024/−0.926 | 1.435/−1.767 |
| goodness of fit | 1.050 | 1.023 | 0.956 |

Equation VII

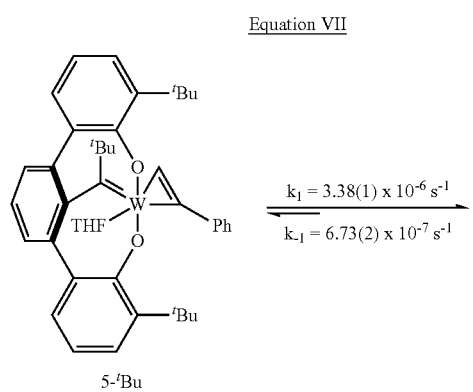

5-$^t$Bu

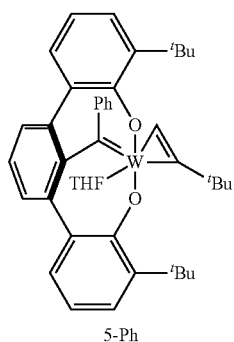

5-Ph

Synthesis of [O$_2$C($^t$BuC=)W(η$^2$-MeC≡CPh)] (6-tBu) and [O$_2$C(PhC=)W(η$^2$-MeC≡C$^t$Bu)] (6-Ph)

Treating 4 ([$^t$BuOCO]W≡CC(CH$_3$)$_3$(THF)$_2$) with 1 equiv of 1-phenyl-propyne in toluene-d$_8$ at −35° C. yields [O$_2$C ($^t$BuC=)W(η$^2$-MeC≡CPh)] 6-tBu and [O$_2$C($^t$BuC=)W (η$^2$-MeC≡C$^t$Bu)] 6-Ph, as indicated in Equation VIII, below, in a 1:2 ratio as determined by $^1$H NMR spectroscopy. No polymer forms during this reaction. Adding pentane to the mixture of 6-tBu and 6-Ph selectively dissolves 6-tBu, leaving behind 6-Ph as a yellow solid. Reducing the pentane soluble solution of 6-tBu under vacuum yields a light yellow solid.

Equation VIII

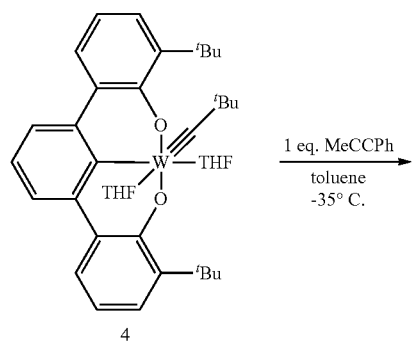

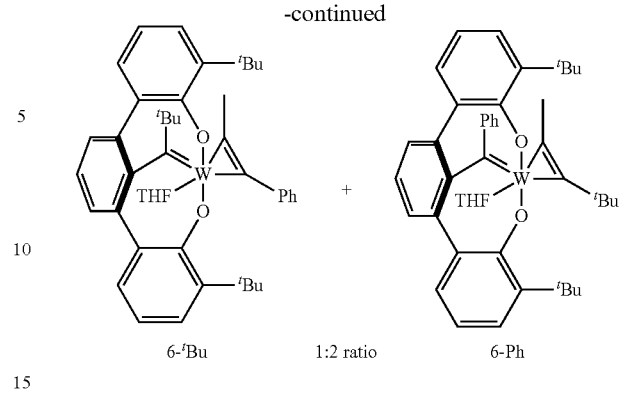

6-$^t$Bu    1:2 ratio    6-Ph

Figure 9:
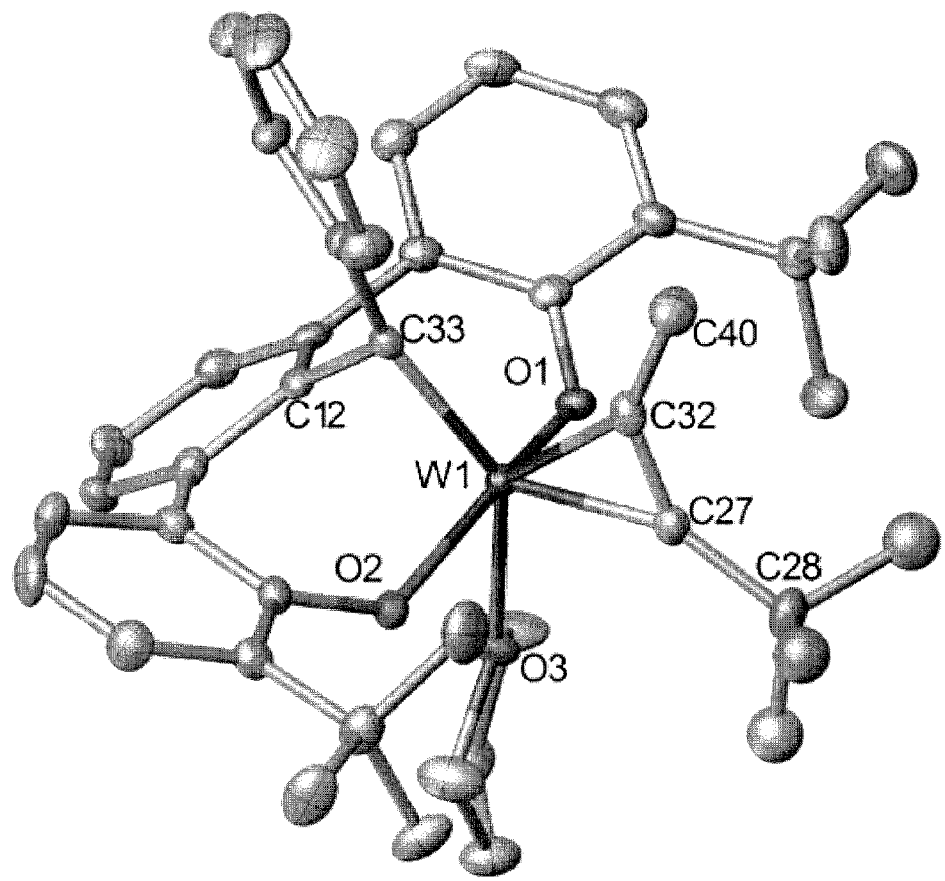
FIG. 9 shows the single crystal x-ray diffraction determined structure of [$O_2C(PhC=)$]W$(\eta^2$-MeC≡C$^tBu)$] (6-Ph), according to an embodiment of the invention, where ellipsoids are presented at 50% probability, hydrogen atoms removed for clarity, and methyl groups attached to C28 are disordered over two positions and are removed for clarity

Table 2, below, contains NMR data that unambiguously assigns the composition of 6-Ph and 6-tBu. Single crystals amenable for X-ray diffraction formed from a concentrated solution of 6-Ph in Et$_2$O at −35° C. FIG. 9 shows the molecular structure of 6-Ph, the caption provides selected bond lengths and angles, and Table 1, above, list X-ray refinement data. Like 5-Ph, complex 6-Ph is pseudo C$_s$-symmetric in the solid state and contains a formal W(VI) ion that does not conform to a standard polyhedral geometry. The pincer ligand binds in a tridentate tetra-anionic form through two phenolate donors and an alkylidene.

TABLE 2

$^1$H and $^{13}$C chemical shifts for 6-$^t$Bu and 6-Ph in toluene-d$_8$ at 25° C.

| Compound→ | 6-Ph | | 6-$^t$Bu | |
|---|---|---|---|---|
| Position↓ | δ $^1$H (ppm) | δ $^{13}$C (ppm) | δ $^1$H (ppm) | δ $^{13}$C (ppm) |
| 1,18 | — | 167.7 | — | 168.6 |
| 2,17 | — | 137.3 | — | 137.4 |
| 3,16 | 7.23 | 125.7 | 7.21 | 125.8 |
| 4,15 | 6.76 | 118.9 | 6.79 | 118.7 |
| 5,14 | 7.23 | 128.2 | 7.31 | 128.0 |
| 6,13 | — | 130.9 | — | 130.8 |
| 7,11 | — | 151.6 | — | 154.8 |
| 8,10 | 7.42 | 129.8 | 7.45 | 128.9 |
| 9 | 7.27 | 132.1 | 7.30 | 132.9 |
| 12 | — | 127.7 | — | 126.7 |
| 19,23 | — | 34.8 | — | 34.5 |
| 20-22, 24-26 | 1.26 | 30.1 | 1.20 | 29.8 |
| 27 | — | 208.7 | — | 200.2 |
| 28 | — | 40.7 | — | 44.5 |
| 29-31 | 1.65 | 30.9 | 0.87 | 34.1 |
| 32 | — | 196.9 | — | 196.9 |
| 33 | — | 251.7 | — | 267.3 |
| 34 | — | 148.9 | — | 141.2 |
| 35,39 | 6.41 | 129.6 | 7.81 | 128.5 |
| 36,38 | 6.88 | 127.0 | 7.42 | 128.3 |
| 37 | 6.64 | 125.7 | 7.18 | 127.3 |
| 40 | 2.82 | 19.3 | 3.34 | 23.5 |

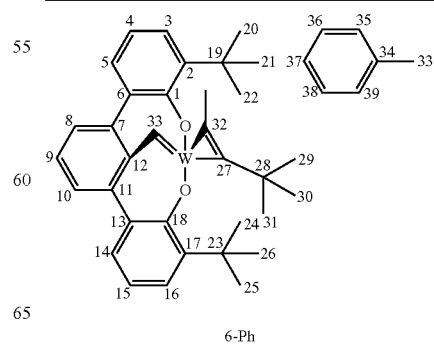

6-Ph

TABLE 2-continued

¹H and ¹³C chemical shifts for 6-ᵗBu and 6-Ph in toluene-d₈ at 25° C.

| Compound→ | 6-Ph | | 6-ᵗBu | |
|---|---|---|---|---|
| Position↓ | δ ¹H (ppm) | δ ¹³C (ppm) | δ ¹H (ppm) | δ ¹³C (ppm) |

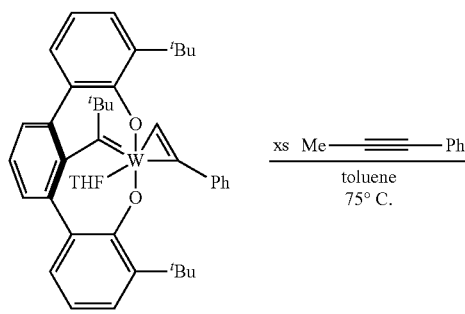

6-ᵗBu

Synthesis of [OC(ᵗBuC≡)O]W[κ²-C(Ph)=C(Me)C(H)=C(Ph)] (7A) and [OC(ᵗBuC≡)O]W[κ²-C(Me)=C(Ph)C(H)=C(Ph)] (7B)

Treating 5-tBu with 10 equiv of MeC≡CPh in toluene-d₈ at 75° C. selectively incorporated two additional acetylene units. The MeC≡CPh inserts into the metallacyclopropene to form a metallacyclopentadiene ring, as shown in Equation IX, below. The insertion yields two isomers, [OC(ᵗBuC≡)O]W[κ²-C(Ph)=C(Me)C(H)=C(Ph)] (7A) and [OC(ᵗBuC≡)O]W[κ²-C(Me)=C(Ph)C(H)=C(Ph)] (7B) in a 2 to 1 ratio via 1,2 versus 2,1 insertion, respectively. Both species are pentane soluble and are inseparable. Nevertheless, a combination of ¹H NMR, ¹³C {¹H}, and 2-D NMR enable the complete characterization of 7A and 7B, as indicated in Table 3, below.

Equation IX

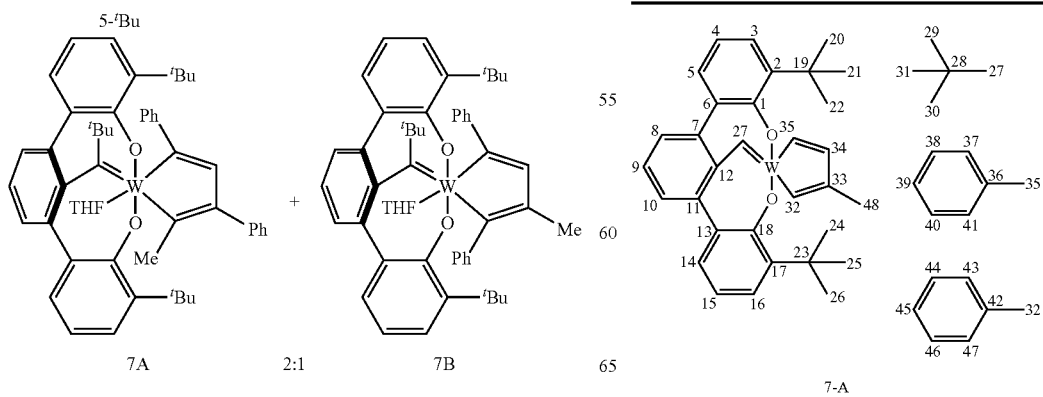

Figure 10:
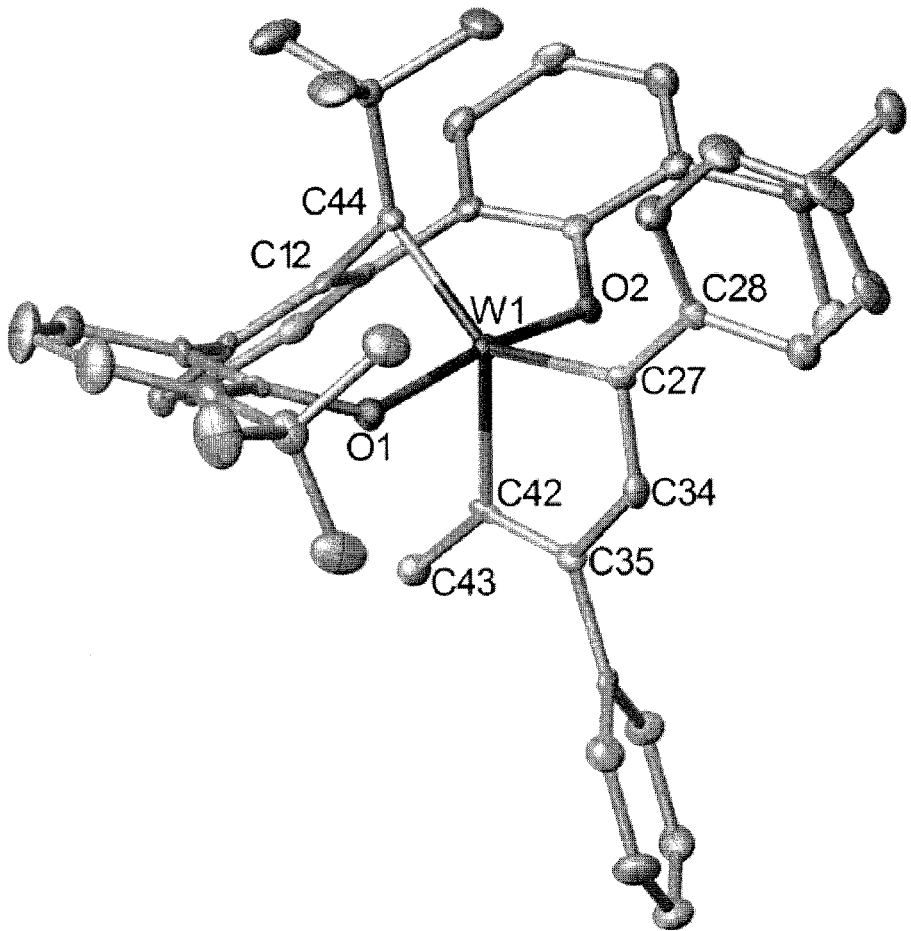
FIG. 10 shows the structure of the single crystal x-ray diffraction determined structure of [OC($^tBuC=$)O]W[$\kappa^2$-C(Ph)=C(Me)C(H)=C(Ph)] (7A), according to an embodiment of the invention, with ellipsoids presented at 50% probability and hydrogen atoms removed for clarity.

Single crystals of 7A amenable to an X-ray diffraction analysis, shown in FIG. 10, deposited from a concentrated solution of 7A and 7B in Et₂O at −35° C., although bulk separation was not possible. FIG. 10 provides selected bond lengths and bond angles, and Table 1, above, lists X-ray refinement data. In the solid state, complex 7A is pseudo $C_s$-symmetric and contains a W(VI) ion in a distorted trigonal bipyramidal geometry with the oxygen atoms in the axial plane. As is observed in the X-ray structure of 5-Ph and 6-Ph, the ligand in 7A, again binds in a tridentate tetra-anionic form through two phenolate donors and an alkylidene.

TABLE 3

Assignment of ¹H and ¹³C chemical shifts for 7A and 7B in toluene-d₈ at 25° C.

| Compound→ | 7A | | 7B | |
|---|---|---|---|---|
| Position ↓ | δ ¹H (ppm) | δ ¹³C (ppm) | δ ¹H (ppm) | δ ¹³C (ppm) |
| 1,18 | — | 168.0 | — | 168.3 |
| 2,17 | — | 138.7 | — | 138.6 |
| 3,16 | 7.31 | 126.0 | 7.31 | 126.2 |
| 4,15 | 6.79 | 119.2 | 6.84 | 119.2 |
| 5,14 | 7.19 | 129.2 | 7.28 | 128.1 |
| 6,13 | — | 129.8 | — | 129.4 |
| 7,11 | — | 155.7 | — | 157.0 |
| 8,10 | 7.16 | 134.5 | 7.58 | 133.8 |
| 9 | 6.77 | 134.9 | 7.33 | 134.5 |
| 12 | — | 105.0 | — | 107.7 |
| 19,23 | — | 35.3 | — | 35.3 |
| 20-22, 24-26 | 1.50 | 30.0 | 1.44 | 30.0 |
| 27 | — | 310.0 | — | 309.9 |
| 28 | — | 46.6 | — | 46.7 |
| 29-31 | 0.93 | 35.8 | 0.96 | 35.8 |
| 32 | — | 205.0 | — | 208.1 |
| 33 | — | 111.3 | — | 116.0 |
| 34 | 7.55 | 115.3 | 7.78 | 114.5 |
| 35 | — | 200.0 | — | 198.5 |
| 36 | — | 141.6 | — | 144.1 |
| 37,41 | 7.56 | 128.6 | 7.48 | 128.6 |
| 38,40 | 7.27 | 128.1 | 7.21 | 128.1 |
| 39 | 7.04 | 127.8 | 7.00 | 127.7 |
| 42 | — | 145.6 | — | 141.5 |
| 43,47 | 6.31 | 126.2 | 7.22 | 127.5 |
| 44,46 | 6.77 | 126.2 | 7.15 | 128.4 |
| 45 | 6.61 | 126.1 | 7.06 | 126.9 |
| 48 | 1.42 | 25.1 | 1.94 | 21.7 |

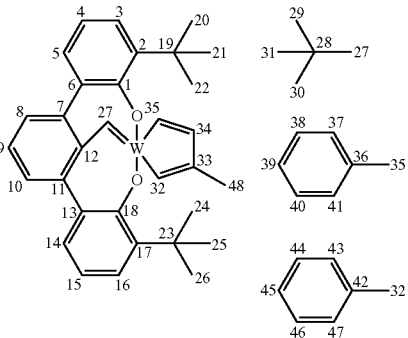

7-A

TABLE 3-continued

Assignment of $^1$H and $^{13}$C chemical shifts for
7A and 7B in toluene-$d_8$ at 25° C.

| Compound→ | 7A | | 7B | |
|---|---|---|---|---|
| Position ↓ | δ $^1$H (ppm) | δ $^{13}$C (ppm) | δ $^1$H (ppm) | δ $^{13}$C (ppm) |

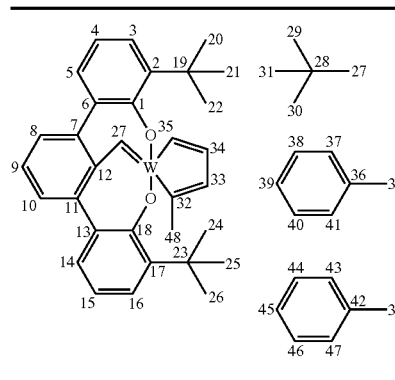

7B

Polymerization of Alkynes

Figure 11:
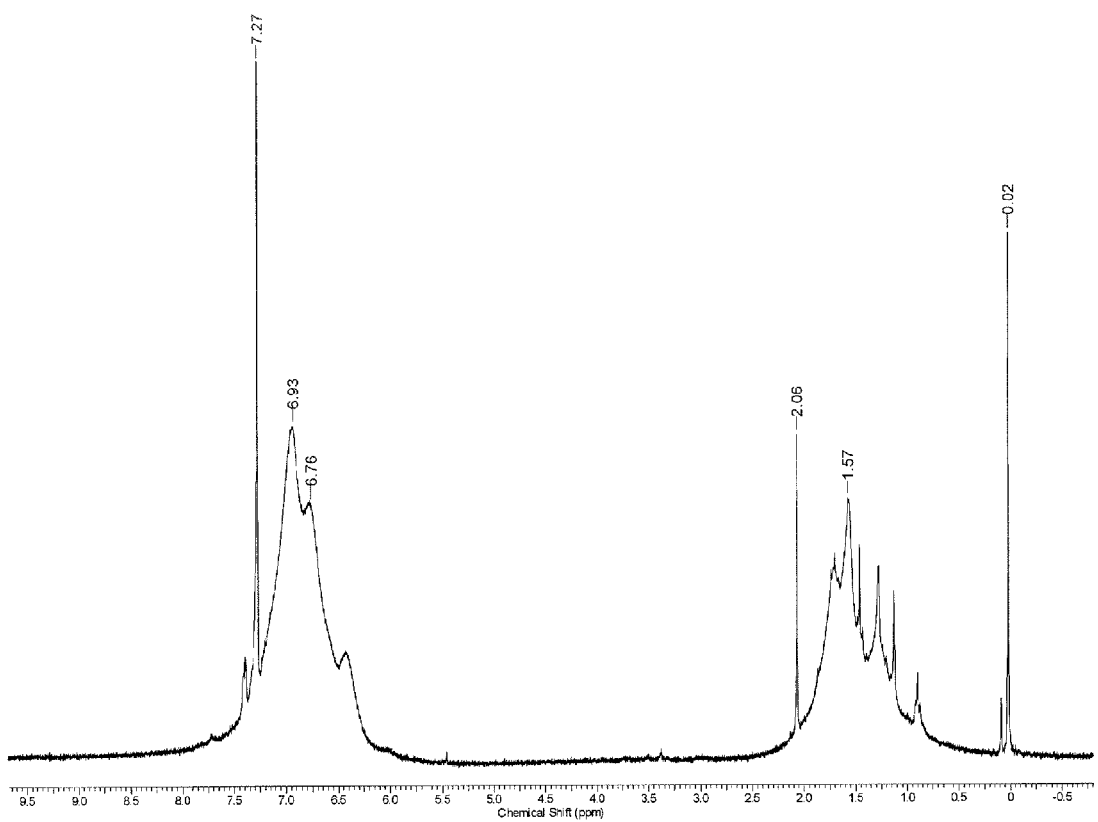
FIG. 11 shows a $^1H$ NMR spectrum of poly(1-phenylpropyne) in $CDCl_3$ at 25° C. prepared by polymerization using catalyst 3, according to an embodiment of the invention.
Figure 12:
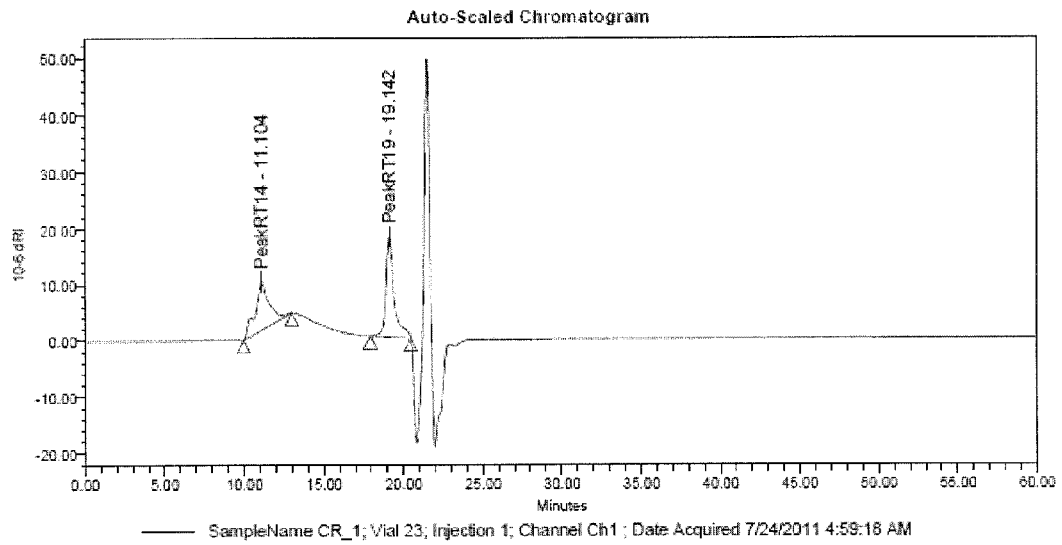
FIG. 12 shows GPC data for a) poly(1-phenylpropyne) and b) poly(phenylacetylene) prepared by polymerization using catalyst 3, according to an embodiment of the invention.
Figure 12:
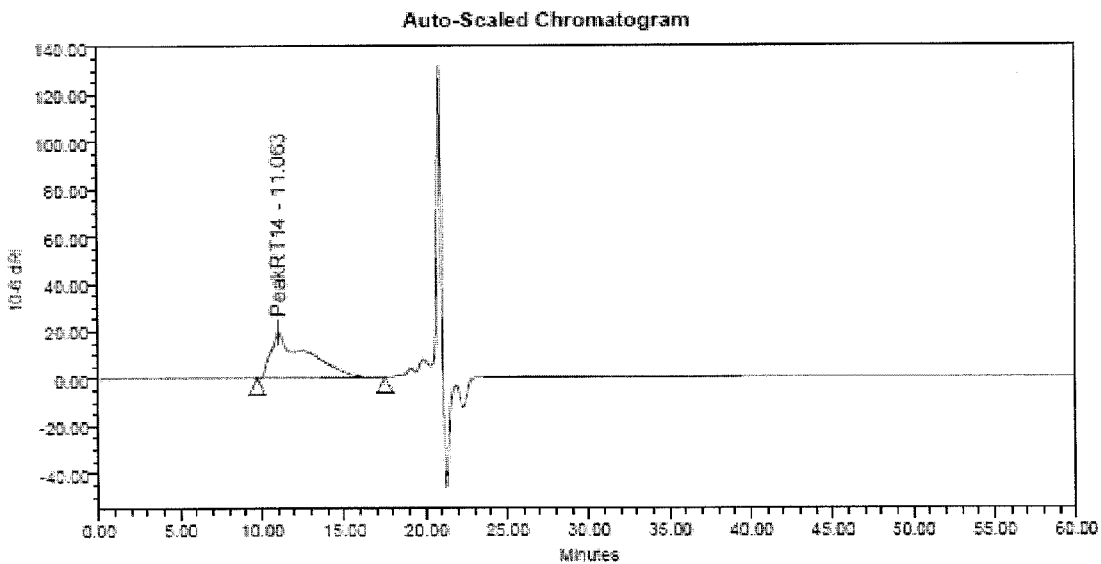

In a nitrogen filled glove-box, phenyl acetylene or 1-phenyl propylene (0.5 mL) was added to a solution of [$^t$BuOCO]W≡CC(CH$_3$)$_3$(Et$_2$O) (3) (7 mg, 0.010 mmol) or 1:1 methyltriflate: {[$^t$BuOCO]W≡CC(CH$_3$)$_3$(O$^t$Bu)}{Ph$_3$PCH$_3$} (2) in 1 mL of toluene with stirring. The mixture was allowed to stir at room temperature for 16 hours. The reaction mixture was removed from the glovebox and precipitated in methanol (20 mL). The polymeric material was collected by filtration and dried in vacuo at 80° C. for 2 hours prior to weighing. A 10 mg portion of dried polymer was dissolved in HPLC grade THF (10 mL), filtered through a 0.45 micron filter, and analyzed by GPC. Results are included in Table 2, below. A $^1$H NMR spectrum for poly(1-phenylpropyne) is shown in FIG. 11. FIG. 12 shows GPC traces for a) poly(1-phenylpropyne) and b) poly(phenyl acetylene).

In a nitrogen filled glove-box a stock solution of [$^t$BuOCO]W≡CC(CH$_3$)$_3$(THF)$_2$ (4) (0.2 μmol in 504 toluene) was added to a dried monomer (1000 μmol). The mixture was allowed to stir at room temperature for 30 minutes. The reaction mixture was removed from the glove-box and precipitated in methanol (20 mL). The polymeric material was collected by filtration and dried under vacuum at 80° C. for 2 hours prior to weighing to obtain the yield. Results are included in Table 4, below.

Figure 13:
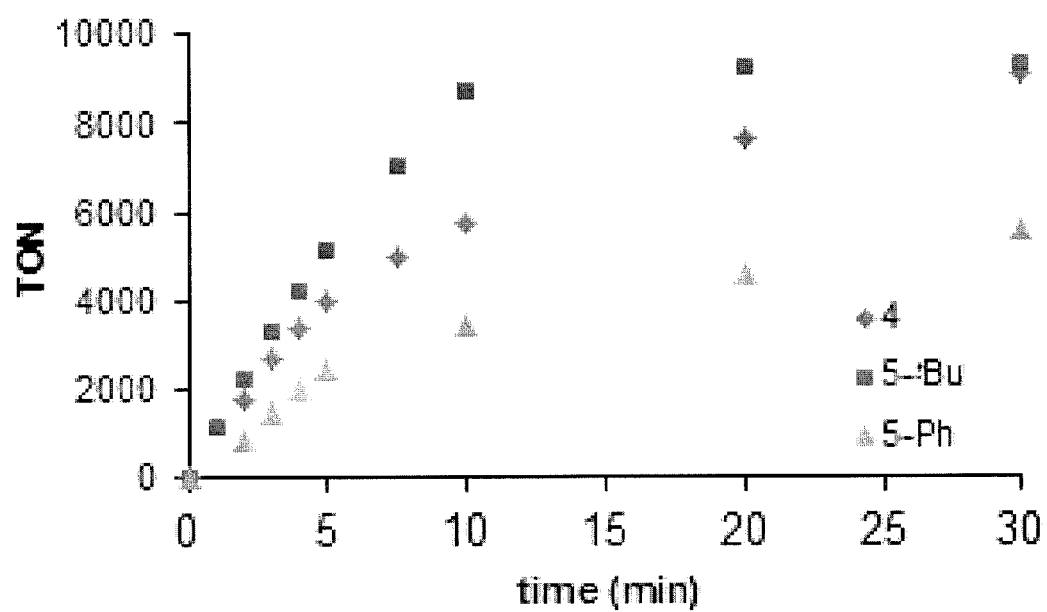
FIG. 13 is a plot of catalytic turn-over number (TON) determined by quantitative yield (mg) of polyphenylacetylene (PPA) vs. time (min) for 4,5-tBu, and 5-Ph, according to an embodiment of the invention, where all data points are the average of three determinations.

As 4 catalyzes phenylacetylene polymerization, complexes 5-tBu and 5-Ph also catalyze phenylacetylene polymerization, suggesting that 4 converts to 5-tBu and 5-Ph in the presence of phenylacetylene. To determine behaviour of 4,5-tBu, and 5-Ph during the polymerization reactions, the kinetics of the phenylacetylene polymerizations were monitored. FIG. 13 shows turnover numbers (TONs) determined by the quantitative yield (mg) of PPA vs. time (min) for polymerizations using 4,5-tBu, and 5-Ph. The substrate to catalyst loading ratio for all polymerizations was 10,000:1 and all were completed in triplicate with the average values provided in the plot. During the first two minutes of the reaction, 4 yields a turnover frequency of 881 monomer units per minute. For the first two minutes of the reaction, 5-tBu yields a turnover frequency of 1126 units min$^{-1}$ and 5-Ph yields a turnover frequency of 433 units min$^{-1}$. The turnover frequency of 4 is consistent with the kinetic formation of 5-tBu, and 5-Ph in a 2:1 ratio, where this ratio weighted turnover frequency average is 895 units min$^{-1}$, which is nearly identical to that of 881 units min$^{-1}$ measured directly for 4.

The ability to separate the two active catalysts is highly advantageous as 5-tBu catalyzes the polymerization of phenylacetylene more quickly and with higher TON than 5-Ph. Catalyst 5-tBu, clearly the more active catalyst, was tested for polymerization activity with a variety of monosubstituted and disubstituted acetylenes, as given in Tables 5 and 6, below. Standard catalytic reactions of monosubstituted acetylenes were performed in toluene containing 1000 μmol of acetylene monomer and either 0.2 μmol or 1.0 μmol of either 1 or 5-tBu. Ethereal solvents, such as THF, retard polymerization, where the suppression of the reaction is consistent with competitive coordination of THF rather than monomer with the tungsten.

In a typical reaction, a toluene solution of the catalyst was added to the stirring solution of acetylene monomer and toluene. The reaction was vigorously stirred for 1 h and quenched with methanol. The resulting polymer was dried in vacuo and weighed to provide the quantitative percent yield and turnover number (TON). Polymer characterization includes FTIR and $^1$H NMR as well as gel permeation chromatography (GPC) for all samples soluble in THF to determine $M_w$ and $M_w/M_n$. Polymerization results using 4 are given in Table 5, below.

TABLE 4

Polymerization Results

| Catalyst | Catalyst (μmol) | Substrate | PE (mg) | Activity (g/molCat) | Yield (%) | TON | Mw (g/mol) | Mw/Mn |
|---|---|---|---|---|---|---|---|---|
| 2 + MeOTf | 20 | PhC≡CMe | 20 | 1,000 | 4 | | 94,908 | 2.27 |
| 3 | 10 | PhC≡CH | 446 | 44,600 | 96 | | 40,806 | 2.88 |
| 3 | 10 | PhC≡CMe | 18 | 1,800 | 4 | | 33,272 | 1.44 |
| 3 | 10 | PhC≡CMe | 18 | 1,800 | 4 | | 193,378 | 1.04 |
| 4 | 0.2 | PhC≡CH | 0.112 | 670,000 | 66 | 3,280 | 35,188 | 4.28 |
| 4 | 0.2 | 4-FPh≡CH | 0.120 | 1,050,000 | 87 | 4,371 | 20,480 | 3.65 |
| 4 | 0.2 | 4-MeOPh≡CH | 0.132 | 620,000 | 47 | 2,346 | 20,637 | 3.33 |

Standard Conditions:
2 and 3—0.5 mL of monomer in 1 mL of toluene, RT, 1 atm, 16 hr;
4—1.000 mmol of monomer in toluene, RT, 1 atm, 30 min.

TABLE 5

Acetylene polymerization results using 4[a]

| Monomer | % Yield | TON | $M_w$[b] | $M_w/M_n$[b] |
|---|---|---|---|---|
| 1-ethynyl-4-methoxybenzene | 91 | 4540 | 39056 | 2.24 |
| Phenylacetylene | 99 | 4994 | 33692 | 3.17 |
| 1-ethnyl-4-fluorobenzene | 70 | 3497 | 34980 | 3.16 |
| 1-ethnyl-3,5-bis(trifluoro-methyl)benzene | 10 | 525 | 10980 | 1.46 |
| 1-decyne | 96 | 4810 | 165915 | 1.27 |
| 3,3-dimethyl-1-butyne[c] | 95 | 950 | 3235 | 1.56 |
| trimethylsilylacetylene[c][d] | 66 | 672 | — | — |

[a](0.2 μmol) in toluene was added to acetylene monomer (1000 μmol) in toluene for 1 h at 25° C.
[b]Determined by GPC.
[c]4 (1.0 μmol) in toluene was added to acetylene monomer (1000 μmol) in toluene and heated for 1 h at 75° C.
[d]$M_w$ and $M_w/M_n$ could not be determined due to polymer insolubility in THF.

Both complex 4 and 5-tBu, as in Table 6, below, polymerize phenylacetylene, 1-ethynyl-4-methoxybenzene, 1-ethnyl-4-fluorobenzene and 1-decyne with remarkably high yield and TON at 25° C. Neither 3,3-dimethyl-1-butyne nor trimethylsilylacetylene polymerizes in the presence of either 4 or 5-tBu at 25° C. However, upon heating the reaction solution at 75° C. with a smaller substrate to catalyst ratio (1,000:1), both 3,3-dimethyl-1-butyne and trimethylsilylacetylene polymerize in relatively good yield. The bulky tert-butyl and trimethylsilyl groups hinder polymerization of these substrates at 25° C. The substrate 1-ethnyl-3,5-bis(trifluoromethyl)benzene forms only a limited quantity of polymer. Lastly, 5-tBu polymerizes the disubstituted acetylene, 1-phenyl-1-propyne, over a period of 24 h at 75° C. All poly(phenylacetylene) polymers are dark-red orange in color. The polymer of 3,3-dimethyl-1-butyne is a white stringy solid, and the polymer of 1-decyne is a white rubbery solid. 1-trimethylsilylacetylene affords a yellow polymer insoluble in most organic solvents, and only partially soluble in methylene chloride. The polymer of 1-phenyl-1-propyne is a white stringy solid.

TABLE 6

Acetylene polymerization results using 5-tBu[a]

| | % Yield | TON | $M_w$[b] | $M_w/M_n$[b] |
|---|---|---|---|---|
| Monosubstituted acetylenes | | | | |
| 1-ethynyl-4-methoxybenzene | 94 | 4691 | 37823 | 2.18 |
| Phenylacetylene | 99 | 4994 | 56620 | 3.49 |
| 1-ethnyl-4-fluorobenzene | 64 | 3205 | 32370 | 3.00 |
| 1-ethnyl-3,5-bis(trifluoro-methyl)benzene | 9 | 462 | 61966 | 1.96 |
| 1-decyne | 97 | 4846 | 163173 | 1.37 |

TABLE 6-continued

Acetylene polymerization results using 5-tBu[a]

| | % Yield | TON | $M_w$[b] | $M_w/M_n$[b] |
|---|---|---|---|---|
| 3,3-dimethyl-1-butyne[c] | 97 | 974 | 3229 | 1.54 |
| trimethylsilylacetylene[c][d] | 54 | 540 | — | — |
| Disubstituted acetyelene | | | | |
| 1-phenyl-1-propyne[e] | 78 | 77 | 33272 | 1.43 |

[a]5-tBu (0.2 μmol) in toluene was added to acetylene monomer (1000 μmol) in toluene for 1 h at 25° C.
[b]Determined by GPC.
[c]5-tBu (1.0 μmol) in toluene was added to acetylene monomer (1000 μmol) in toluene and heated for 1 h at 75° C.
[d]$M_w$ and $M_w/M_n$ could not be determined due to polymer insolubility in THF.
[e]5-tBu (1.0 μmol) in toluene was added to acetylene monomer (100 μmol) in toluene and heated for 24 h at 75° C.

Overall, 5-tBu polymerizes a wide variety of acetylene monomers not normally seen for such polymerization catalysts. 5-tBu is noteworthy of tungsten catalyst as it is capable of polymerizing both phenylacetylene and its functionalized derivatives. Additionally, 5-tBu polymerizes the disubstituted monomer, 1-phenyl-1-propyne. In this respect, 5-tBu is a rare example of an acetylene polymerization catalyst capable of polymerizing multiple substrate classes.

The most remarkable feature of the catalysis is the exceptionally high activity and turnover number. Complexes 4,5-tBu and 5-Ph were screened to find the highest attainable turnover number and catalytic activity. Complex 5-tBu supplies the best catalytic values in all cases. With a substrate-to-catalyst loading of 25,000 to 1, complex 5-tBu turns over approximately 17,233 phenylacetylene monomer units, as indicated in Table 7, below. Additionally, 5-tBu polymerizes phenylacetylene and 1-decyne with catalytic activities up to $5.64 \times 10^6$ $g_{PPA}$ mol$^{-1}$ h$^{-1}$ and $7.98 \times 10^6$ $g_{PA}$ mol$^{-1}$ h$^{-1}$, respectively.

TABLE 7

Optimized polymerization results using 5-tBu

| Monomer | mon:cat | % Yield | t (min) | TON | $g_{PA}$/mol/h |
|---|---|---|---|---|---|
| Phenylacetylene | 25,000:1 | 69 | 60 | 17,233 | 1,760,000 |
| Phenylacetylene | 10,000:1 | 92 | 10 | 9,204 | 5,640,000 |
| 1-Decyne | 10,000:1 | 96 | 10 | 9,620 | 7,980,000 |

Figure 14:
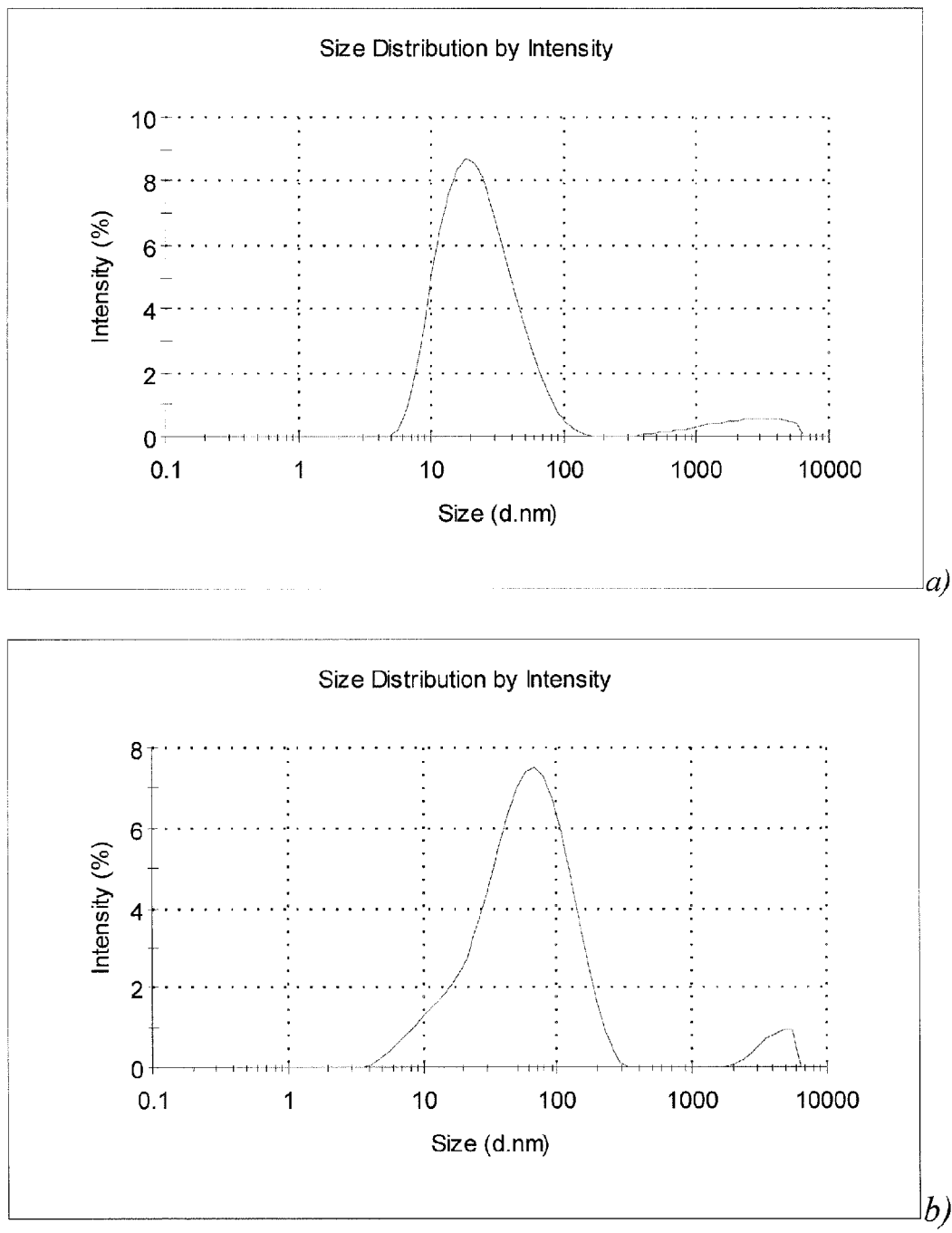
FIG. 14 shows dynamic light scattering plots of a) cyclic polyphenylacetylene prepared according to an embodiment of the invention, and b) linear polyphenylacetylene of the same molecular weight.

As can be seen in FIG. 14, a dynamic light scattering experiment was carried out using the polyphenylacetylene prepared, according to an embodiment of the invention, with a tridentate pincer ligand supported tungsten complex and a linear polyphenylacetylene prepared by a state of the art method that yields an equivalent molecular weight. Dynamic light scattering indicated that the polyphenylacetylene, according to an embodiment of the invention, assumed an average diameter of 20.29 nm in solution whereas the linear polymer of the same molecular weight displayed an average diameter of 47.18 nm in solution. The difference in the values for the same molecular weight polymer is consistent with the hydrodynamic radius of the linear polymer being that of an average conformation that is not a spherical particle whereas the lower degree of conformational freedom of a cyclic polymer results in a more compact average structure.

All publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:
1. A tridentate pincer ligand supported metal complex, comprising the structure:

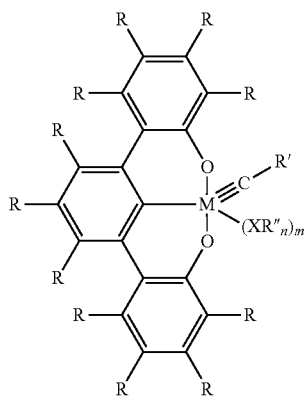

where: M is a group 5-7 transition metal; R is independently, H, methyl, ethyl, n-propyl, i-propyl, n-butyl, i-butyl, t-butyl, or $C_5$ to $C_{20}$ alkyl: R' is methyl, ethyl, n-propyl, i-propyl, n-butyl, i-butyl t-butyl, $C_5$ to $C_{20}$ alkyl, phenyl, naphthyl, or $C_{13}$ to $C_{22}$ aryl; X is independently O, N, S, P, or Se; n is independently 1 to 2, m is 1 to 2, and R" is independently methyl, ethyl, n-propyl, i-propyl, n-butyl, i-butyl, t-butyl, $C_5$ to $C_{20}$ alkyl, phenyl, naphthyl, $C_{13}$ to $C_{18}$ aryl or two R" are combined as a $C_4$ to $C_6$ alkylene, wherein $XR"_2$ is a 5 to 7-membered ring; or

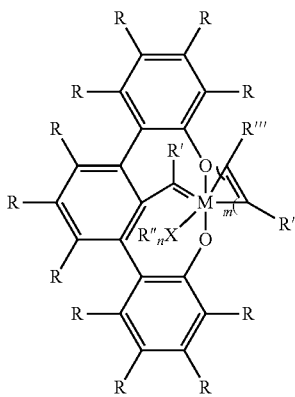

where: R is, independently, H, methyl, ethyl, n-propyl, i-propyl, n-butyl, i-butyl t-butyl, or larger alkyl; R' is, independently, methyl, ethyl, n-propyl, i-propyl, n-butyl, i-butyl, t-butyl, $C_5$-$C_{22}$ alkyl, phenyl, naphthyl, $C_{13}$-$C_{22}$ aryl, aryl substituted with one or more fluoro, $C_1$-$C_3$ alkoxy, or trifluoromethyl, or trimethylsilyl; R''' is H or methyl; X, independently, is O, N, S, P, or Se; R", independently, is methyl, ethyl, n-propyl, i-propyl, n-butyl, i-butyl, t-butyl, $C_5$-$C_{22}$, phenyl, naphthyl, $C_{13}$-$C_{22}$ aryl, or two R" are combined as a $C_4$ to $C_6$ alkylene; n is 1 to 3 depending on X; m is 1 to 2; and M is a group 5-7 transition metal.

2. The tridentate pincer ligand supported metal complex of claim 1, wherein M is W.

3. The tridentate pincer ligand supported metal complex of claim 1, wherein R is alkyl in the 3 and 3" positions and H in all other positions.

4. The tridentate pincer ligand supported metal complex of claim 1, wherein X is O.

5. The tridentate pincer ligand supported metal complex of claim 1, wherein $XR"_n$ is diethyl ether or tetrahydrofuran.

6. A trianionic pincer ligand supported metal-alkylidyne salt, comprising a tridentate pincer ligand supported metal complex anion and a cation derived from protonation of a base selected from tripheylphosphorane, methyllithium, n-butyllithium, imidazole, pyrazole, pyridine, and 1,8diazabicyclo[5.4.0]undec-7-ene.

7. The trianionic pincer ligand supported metal-alkylidyne salt of claim 6, having the structure:

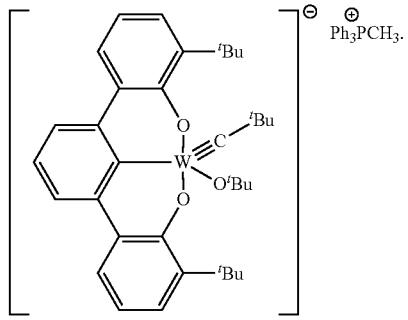

8. The tridentate pincer ligand supported metal complex of claim 1, having the structure:

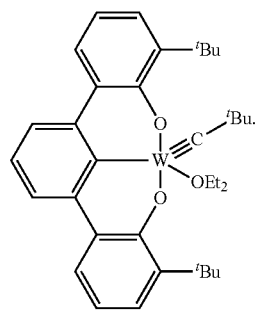

9. The tridentate pincer ligand supported metal complex of claim 1, having the structure:

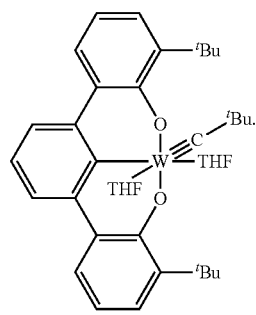

10. The tridentate pincer ligand supported metal complex of claim 1, having the structure:

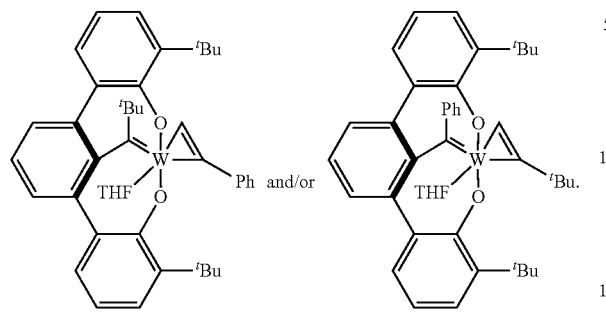

11. The tridentate pincer ligand supported metal complex of claim 1, having the structure:

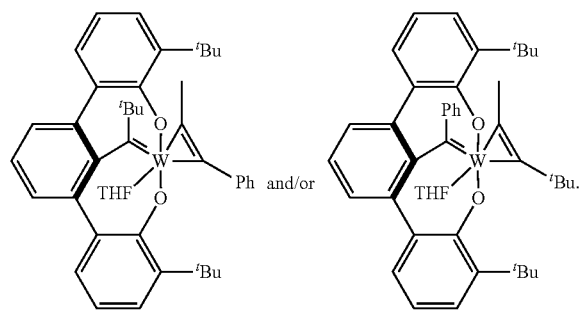

12. The tridentate pincer ligand supported metal complex of claim 1, having the structure:

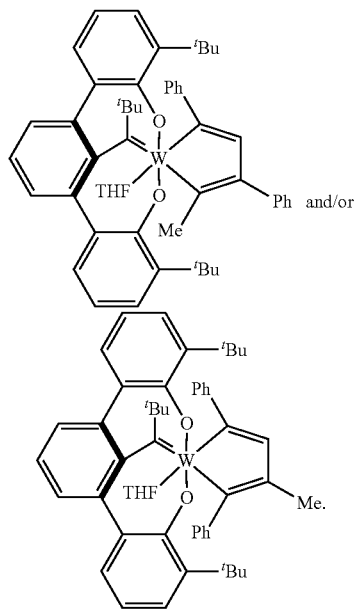

13. A method for the preparation of the tridentate pincer ligand supported metal complex of claim 1, comprising: combining a trialkoxy metal-alkylidyne with an OCO pincer ligand having a 1,1':3',1" terphenyl-2,2"-diol structure:

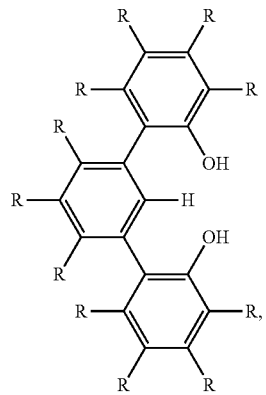

wherein R is independently, H, methyl, ethyl, n-propyl, i-propyl, n-butyl, i-butyl, t-butyl, or $C_5$ to $C_{20}$ alkyl, and wherein the metal of the trialkoxy metal-alkylidyne is a group 5-7 transition metal; and deprotonating the 2'-H of the OCO pincer ligand precursor by addition of a base, wherein the trianionic pincer ligand supported metal-alkylidyne complex of claim 1 is a salt, wherein the anion of the salt is a trianionic pincer ligand supported metal-alkylidyne complex.

14. The method of claim 13, wherein the base is triphenylphosphorane, methyllithium, n-butyllithium, imidazole, pyrazole, pyridine, or 1,8-diazabicyclo[5.4.0]undec-7-ene.

15. The method of claim 13, further comprising addition of an electrophile, wherein the salt is converted into a neutral trianionic pincer ligand supported metal-alkylidyne complex.

16. The method of claim 15, wherein the electrophile is an alkyl-triflate or an alkyl-tetrafluoroborate.

17. The method of claim 15, further comprising providing a second ligand and exchanging a first ligand of the neutral trianionic pincer ligand supported metal-alkylidyne complex to form a second neutral trianionic pincer ligand supported metal-alkylidyne complex.

18. The method of claim 17, further comprising adding one to ten equivalents of an alkyne to the second neutral trianionic pincer ligand supported metal-alkylidyne complex to form a tetra-anionic pincer-ligand supported metallacycloalkylene complex.

19. A method of polymerizing an alkyne, comprising: providing a catalytic amount of a tridentate pincer ligand supported metal complex according to claim 1; and combining the trianionic pincer ligand supported metal-alkylidyne complex with a plurality of alkyne monomers to form a poly (alkyne).

20. The method of claim 19, wherein the tridentate pincer ligand supported metal complex and alkyne monomers are provided in an aprotic solvent.

21. The method of claim 19, further comprising providing an electrophile, wherein the tridentate pincer ligand supported metal complex is a salt.

22. The method of claim 19, wherein the poly(alkyne) has a macrocyclic structure.

23. The method of claim 19, wherein the alkyne monomer is phenylacetylene.

* * * * *

UNITED STATES PATENT AND TRADEMARK OFFICE
CERTIFICATE OF CORRECTION

PATENT NO. : 9,206,266 B2
APPLICATION NO. : 14/299449
DATED : December 8, 2015
INVENTOR(S) : Adam Steven Veige et al.

Page 1 of 1

It is certified that error appears in the above-identified patent and that said Letters Patent is hereby corrected as shown below:

In the specification,

Column 11,
Line 67, "7.52 (t, $J$ = 7.2 Hz, 411, Ar-H)" should read --7.52 (t, $J$ = 7.2 Hz, 4H, Ar-*H*)--.

Column 13,
Line 63, "Synthesis of [O$_2$C($^t$BuC=)W(Θ$^2$-HC≡CPh)]" should read --Synthesis of [O$_2$C($^t$BuC=)W($\eta^2$-HC≡CPh)]--.

Column 19,
Line 42, "(0.2 $\mu$mol in 504 toluene)" should read --(0.2 $\mu$mol in 50 μL toluene)--.

Column 21,
Line 19, "[a] (0.2 μmol) in toluene" should read --[a]4 (0.2 μmol) in toluene--.

Signed and Sealed this
Fifth Day of April, 2016

Michelle K. Lee
*Director of the United States Patent and Trademark Office*